United States Patent
Gryska et al.

(10) Patent No.: US 10,093,753 B2
(45) Date of Patent: Oct. 9, 2018

(54) SYRUP POLYMER COMPOSITIONS AND ADHESIVES THEREFROM

(71) Applicant: 3M INNOVATIVE PROPERTIES COMPANY, St. Paul, MN (US)

(72) Inventors: Stefan H. Gryska, Woodbury, MN (US); Hae-Seung Lee, Woodbury, MN (US); Sung-Won Ha, Seoul (KR); Jenny B. Werness, St. Paul, MN (US); Erick I. Soto Cantu, Woodbury, MN (US); Babu N. Gaddam, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 2 days.

(21) Appl. No.: 15/529,661

(22) PCT Filed: Dec. 1, 2015

(86) PCT No.: PCT/US2015/063077
§ 371 (c)(1),
(2) Date: May 25, 2017

(87) PCT Pub. No.: WO2016/089805
PCT Pub. Date: Jun. 9, 2016

(65) Prior Publication Data
US 2017/0362348 A1  Dec. 21, 2017

Related U.S. Application Data

(60) Provisional application No. 62/087,836, filed on Dec. 5, 2014.

(51) Int. Cl.
| | | |
|---|---|---|
| *C09J 4/06* | (2006.01) | |
| *C08F 2/38* | (2006.01) | |
| *C08F 2/50* | (2006.01) | |
| *C08F 265/06* | (2006.01) | |
| *C09J 151/00* | (2006.01) | |
| *C08F 220/06* | (2006.01) | |
| *C08F 220/20* | (2006.01) | |
| *C08F 220/30* | (2006.01) | |
| *C08F 220/34* | (2006.01) | |
| *C08F 222/10* | (2006.01) | |
| *C09J 133/02* | (2006.01) | |
| *C09J 133/08* | (2006.01) | |
| *C09J 133/04* | (2006.01) | |
| *C09J 133/12* | (2006.01) | |
| *C08F 220/18* | (2006.01) | |

(52) U.S. Cl.
CPC .............. *C08F 2/38* (2013.01); *C08F 2/50* (2013.01); *C08F 220/06* (2013.01); *C08F 220/20* (2013.01); *C08F 220/30* (2013.01); *C08F 220/34* (2013.01); *C08F 222/1006* (2013.01); *C08F 265/06* (2013.01); *C09J 151/003* (2013.01); *C08F 2220/1858* (2013.01); *C08F 2220/1875* (2013.01); *C08F 2400/02* (2013.01); *C08F 2500/01* (2013.01); *C08F 2800/20* (2013.01); *C09J 4/06* (2013.01); *C09J 133/02* (2013.01); *C09J 133/04* (2013.01); *C09J 133/08* (2013.01); *C09J 133/12* (2013.01)

(58) Field of Classification Search
None
See application file for complete search history.

(56) References Cited

U.S. PATENT DOCUMENTS

| | | | |
|---|---|---|---|
| 4,329,384 | A | 5/1982 | Vesley |
| 4,330,590 | A | 5/1982 | Vesley |
| 5,506,279 | A | 4/1996 | Babu |
| 5,773,485 | A | 6/1998 | Bennett |
| 5,804,610 | A | 9/1998 | Hamer |
| 5,902,836 | A | 5/1999 | Bennett |
| 6,235,922 | B1 | 5/2001 | Robl |
| 6,448,301 | B1 | 9/2002 | Gaddam |
| 6,448,339 | B1 | 9/2002 | Tomita |

(Continued)

FOREIGN PATENT DOCUMENTS

| | | |
|---|---|---|
| EP | 1422278 | 5/2004 |
| EP | 2568026 | 3/2013 |

(Continued)

OTHER PUBLICATIONS

O'Brien, "Facile, Versatile and Cost Effective Route to Branched Vinyl Polymers", Polymer Communication, 2000, vol. 41, pp. 6027-6031.

(Continued)

*Primary Examiner* — Richard A Huhn
(74) *Attorney, Agent, or Firm* — Kent S. Kokko

(57) ABSTRACT

Acrylic syrup polymer composition are provided by partially polymerizing a (meth)acrylic monomer mixture in the presence of a thiol chain transfer agent to produce a first syrup polymer composition comprising a low molecular weight solute (meth)acrylic copolymer and solvent monomers, quenching the chain transfer agent, further polymerizing the first syrup polymer composition to produce a second syrup polymer composition comprising the low molecular weight solute acrylic copolymer, a high molecular weight solute acrylic copolymer and optionally unreacted solvent monomers, optionally adding a crosslinker and photoinitiator; and further photopolymerizing the syrup polymer composition to produce a pressure-sensitive adhesive.

22 Claims, No Drawings

(56) References Cited

U.S. PATENT DOCUMENTS

| | | |
|---|---|---|
| 6,657,011 B2 | 12/2003 | Lau |
| 6,783,850 B2 | 8/2004 | Takizawa |
| 6,939,911 B2 | 9/2005 | Tosaki |
| 7,459,489 B2 | 12/2008 | Lewandowski |
| 7,838,110 B2 | 11/2010 | Zhu |
| 8,507,612 B2 | 8/2013 | Zhu |
| 2004/0096651 A1* | 5/2004 | Yamamoto .............. A61L 15/26 428/343 |
| 2004/0202879 A1 | 10/2004 | Xia |

FOREIGN PATENT DOCUMENTS

| | | |
|---|---|---|
| WO | WO 2000-04079 | 1/2000 |
| WO | WO 2013-074446 | 5/2013 |
| WO | WO 2014-186265 | 11/2014 |
| WO | WO 2015-143649 | 10/2015 |

OTHER PUBLICATIONS

Wakabayashi, "Studies on s-Triazines. I. Cotrimerization of Trichloroacetonitrile with Other Nitriles", Bulletin of The Chemical Society of Japan, 1969, vol. 42, pp. 2924-2930.

International Search Report for PCT International Application No. PCT/US2015/063077, dated Feb. 17, 2016, 5 pages.

* cited by examiner

SYRUP POLYMER COMPOSITIONS AND ADHESIVES THEREFROM

CROSS REFERENCE TO RELATED APPLICATIONS

This application is a national stage filing under 35 U.S.C. 371 of PCT/US2015/063077, filed Dec. 1, 2015, which claims the benefit of U.S. Application No. 62/087,836, filed Dec. 5, 2014, the disclosure of which is incorporated by reference in its/their entirety herein.

BACKGROUND

Pressure-sensitive tapes are virtually ubiquitous in the home and workplace. In its simplest configuration, a pressure-sensitive tape comprises an adhesive and a backing, and the overall construction is tacky at the use temperature and adheres to a variety of substrates using only moderate pressure to form the bond. In this fashion, pressure-sensitive tapes constitute a complete, self-contained bonding system.

According to the Pressure-Sensitive Tape Council, adhesives are known to possess properties including the following: (1) adherence with no more than finger pressure, (2) sufficient ability to hold onto an adherend, and (3) sufficient cohesive strength to be removed cleanly from the adherend. Materials that have been found to function well as adhesives include polymers designed and formulated to exhibit the requisite viscoelastic properties resulting in a desired balance of tack, peel adhesion, and shear holding power.

These requirements are assessed generally by means of tests which are designed to individually measure tack, adhesion (peel strength), and cohesion (shear holding power), as noted in A. V. Pocius in Adhesion and Adhesives Technology: An Introduction, $2^{nd}$ Ed., Hanser Gardner Publication, Cincinnati, Ohio, 2002. These measurements taken together constitute the balance of properties often used to characterize an adhesive.

Acrylic adhesives are known to provide good performance, however efforts have been made to increase the molecular weight in an effort to improve the cohesive strength. However, an increase in the molecular weight reduces the tack of the adhesive.

SUMMARY

The present disclosure provides novel methods for producing acrylic adhesive compositions that comprise the steps of:
a) partially polymerizing a (meth)acrylic monomer mixture in the presence of a thiol chain transfer agent to produce a first syrup polymer composition comprising a low $M_w$ solute copolymer and unreacted solvent monomers;
b) quenching the thiol with an amine,
c) provide a high $M_w$ copolymer to provide a second syrup comprising a low $M_w$ solute copolymer, a high Mw solute copolymer and unreacted solvent monomers
d) optionally adding a crosslinker and a photoinitiator to the syrup polymer of step c), and
e) photopolymerizing the syrup polymer composition of steps c) or d).

In some embodiments, the high $M_w$ copolymer is separately prepared and combined with the first syrup copolymer, after the quenching of the chain transfer agent.

In other embodiments, the high Mw copolymer is generated in situ by further polymerization of the syrup after quenching the chain transfer agent. In such embodiments the method comprise the steps of:
a) partially polymerizing a (meth)acrylic monomer mixture in the presence of a thiol chain transfer agent to produce a first syrup polymer composition comprising a low molecular weight solute (meth)acrylic copolymer and solvent monomers,
b) quenching the chain transfer agent,
c) further polymerizing the first syrup polymer composition to produce a second syrup polymer composition comprising the low molecular weight solute acrylic copolymer, a high molecular weight solute acrylic copolymer and optionally unreacted solvent monomers.
d) optionally adding a crosslinker and photoinitiator; and
e) further photopolymerizing the syrup polymer composition of step d).

The present disclosure also provides pressure-sensitive adhesives prepared from the crosslinkable compositions (e.g., syrup compositions) described herein, as well as pressure-sensitive adhesive articles that include, for example, a coating of such adhesive. The pressure-sensitive adhesives, the crosslinked compositions, of this disclosure provide the desired balance of tack, peel adhesion, and shear holding power, and further conform to the Dahlquist criteria, i.e., the modulus of the adhesive at the application temperature, typically room temperature, is less than $3 \times 10^6$ dynes/cm at a frequency of 1 Hz.

Although it is widely known that the polymers with relatively narrow Molecular distribution have better performances certain applications, broad polydispersity would be beneficial for ease of processing and ease of application since they possess good balance of adhesion and cohesion. Since the low Molecular polymers have similar compositions and glass transition temperatures as the base polymers, compatibility is not an issue. Further, the propensity to migrate from the adhesive matrix is less likely as long as the concentration and molecular weight of the polymer are kept at a certain threshold. The presence of low molecular weight in the adhesives offers excellent compliance and are particularly useful to bond rough, porous, curvy and difficult to bond substrates. Such PSA systems would be stable even under harsh aging conditions.

In this application "pre-adhesive" refers to the syrup polymer composition comprising a low $M_w$ solute copolymer, a high $M_w$ solute copolymer, a monomer mixture and a crosslinking agent. The pre-adhesive may be further polymerized to form a pressure-sensitive adhesive. The pre-adhesive may refer to the syrup polymer compositions of any of steps a) to e). Normally the pre-adhesive of step d) is coated out on a suitable substrate and further cured to produce an adhesive article comprising the substrate and a layer of cured adhesive on a surface thereof.

"Syrup composition" refers to a solution of solute copolymer(s) in one or more solvent monomers, the composition having a viscosity of from 500 to 20,000 cPs at 22° C.

Herein, "(meth)acryloyl" is inclusive of (meth)acrylate and (meth)acrylamide.

Herein, "(meth)acrylic" includes both methacrylic and acrylic.

Herein, "(meth)acrylate" includes both methacrylate and acrylate.

Herein, "alkyl" includes straight-chained, branched, and cyclic alkyl groups and includes both unsubstituted and substituted alkyl groups. Unless otherwise indicated, the alkyl groups typically contain from 1 to 20 carbon atoms. Examples of "alkyl" as used herein include, but are not limited to, methyl, ethyl, n-propyl, n-butyl, n-pentyl, isobutyl, t-butyl, isopropyl, n-octyl, 2-octyl, n-heptyl, ethylhexyl, cyclopentyl, cyclohexyl, cycloheptyl, adamantyl, and norbornyl, and the like. Unless otherwise noted, alkyl groups may be mono- or polyvalent.

The (meth)acrylic monomer mixture comprises at least one (meth)acrylic ester monomer and may further comprise acid-functional monomers, non-acid functional polar monomers and other monomers, as described. In some embodiments, the monomer mixture comprises polymerizable monomers having photoinitiator groups, which when copolymerized, produce copolymers having pendent photoinitiator groups that may be used in the photopolymerization step.

In another embodiment, the solute copolymer resulting from step a) is functionalized with a photoinitiator group to produce copolymers having pendent photoinitiator groups that may be used in a photopolymerization step.

In another embodiment, the (meth)acrylic monomer mixture comprises t-butyl acrylate monomers, to produce copolymers having pendent t-butyl groups that may be hydrolyzed to produce acid groups.

In the quenching step, the thiol chain transfer agents may be quenched by several means, generally by addition of a tertiary amine, or the incorporation of an amine-functional monomer, such as a dialkylaminoalkyl (meth)acrylate into the monomer mixture.

DETAILED DESCRIPTION

This disclosure provides methods of making a (meth)acrylate adhesive which comprises partially polymerizing a (meth)acrylate monomer mixture in the presence of a thiol chain transfer agent to provide a syrup polymer composition having a low molecular weight solute copolymer. The chain transfer agent is quenched and the first syrup composition is again polymerized to provide a second syrup polymer composition having a high molecular weight solute copolymer. The second syrup polymer composition is provided with a crosslinking agent and further polymerized to provide the adhesive composition. In general, a low $M_w$ copolymer will have a $M_w$ from 3000 to 300,000 and a high $M_w$ copolymer will have a $M_w$ of 300,000 to 3,000,000.

It will be understood that a syrup polymerization method will produce a "dead polymer" in the initial free radical polymerization; i.e. a polymerized, not free-radically polymerizable polymer. The syrup method provides advantages over solvent or solution polymerization methods; the syrup method yielding higher molecular weights (in the absence of a chain transfer agent). These higher molecular weights of the second step of polymerization increase the amount of chain entanglements, thus increasing cohesive strength. Subsequently the solvent monomers do not free-radically polymerize onto the extant solute copolymer. However, if the syrup copolymer is further functionalized with a photoinitiator group or a polymerizable group, the resulting functionalized copolymer can further participate in polymerization reactions.

As the syrup polymerization yields dead polymers, the method will produce a distinct low $M_w$ copolymer in step a), a high $M_w$ copolymer in step c) and a third, crosslinked copolymer in step e). Depending on the type of crosslinker added prior to the final photopolymerization, the high and/or the low $M_w$ copolymers may be also crosslinked in the final polymerization.

In one embodiment the adhesive composition may be prepared by the steps of:

a) partially polymerizing a (meth)acrylic monomer mixture in the presence of a thiol chain transfer agent to produce a first syrup polymer composition comprising a low $M_w$ solute copolymer and unreacted solvent monomers;
b) quenching the thiol chain transfer agent,
c) further polymerizing to produce a second syrup polymer composition comprising a low Mw solute copolymer, a high Mw solute copolymer, and unreacted solvent monomers;
d) optionally adding a crosslinker and a photoinitiator to the syrup polymer of step c), and
e) further photopolymerize the syrup polymer composition of step c).

The product of the above method will be a mixture of the high- and low $M_w$ copolymers, and a crosslinked third copolymer produced in the last polymerization step. If a multiacrylate crosslinking agent used, only the third polymer may be crosslinked. If a halotriazine or hydrogen-abstraction type crosslinking agent is used, then the high $M_w$ copolymer and/or the low $M_w$ copolymer may be crosslinked as well. Generally, the syrup polymer is coated on a suitable substrate prior to the final photopolymerization step.

As a chain transfer step is be added in step a) to produce the low $M_w$ solute polymer, it is necessary to quench the residual chain transfer agent prior to subsequent polymerization steps by the addition of an amine, which catalyzes the Michael addition of the thiol to unreacted acrylate monomer. The quenching of the chain transfer agent allows the preparation of a high Mw copolymer. The amine is used in amounts in excess of the molar equivalents of acid (such as from acrylic acid) in the solvent monomer and solute copolymer.

The initial monomer mixture comprises:
a) 50-99 parts by weight of (meth)acrylate ester monomers;
b) 1-50 parts by weight of polar monomers, inclusive of acid-functional monomers wherein the sum of the monomers is 100 parts by weight.

As acid functional monomers are often accounted for accounted considered separately from polar monomers, the initial monomer mixture generally comprises:
c) 50-99 parts by weight of (meth)acrylate ester monomers;
d) 0.1-15 parts by weight of acid-functional monomers;
e) 0 to 50 parts by weight of non-acid functional polar monomers, wherein the sum of the monomers is 100 parts by weight.

An amine catalyzes the Michael addition of the thiol chain transfer agent to a solvent (meth)acrylate monomer, rendering it inactive. As acrylic adhesives generally have an acrylic acid content of up to about 15 parts by weight, the acid groups will prevent the amine from catalyzing the Michael addition of the thiol to unreacted acrylate monomer during the quench step. One can add amine in amounts in excess of the molar equivalents of acid, but Applicants have discovered the use of t-butyl acrylate to serve as a latent acid group. After quenching the thiol chain transfer agent, addition of an acid hydrolyzes the t-butyl acrylate groups to acid groups.

In a second embodiment the method comprises:
a) partially polymerizing a (meth)acrylic monomer mixture in the presence of a thiol chain transfer agent to produce a first syrup polymer composition comprising a low $M_w$ solute copolymer having pendent t-butyl ester groups, and unreacted solvent monomers, wherein the monomer mixture comprises less than 1 part by weight of acid-functional monomers, and 0.1 to 15 parts by weight of t-butyl acrylate monomers;
b) quench the thiol chain transfer agent by addition of an amine,
c) further polymerize the syrup polymer composition to produce a second syrup polymer composition comprising a low $M_w$ solute copolymer, a high Mw solute copolymer and unreacted solvent monomers'
d) add a crosslinker to the syrup polymer of step c), and
e) further photopolymerize the syrup polymer composition of step c) to produce a second syrup polymer composition comprising the low Mw solute copolymer, a high Mw solute copolymer, and a third crosslinked copolymer.
wherein a catalytic amount of acid such a trifluoroacetic acid is added to the syrup polymer compositions of any of steps c), d) or e) to hydrolyze the t-butyl groups to acid groups.

In the second embodiment, the initial monomer mixture may comprise:
a) 50-99.9 parts by weight of (meth)acrylate ester monomers, including 0.1 to 15 parts by weight of t-butyl acrylate monomers;
b) less than 1 parts by weight of acid-functional monomers;
c) 0 to 50 parts by weight of (other) polar monomers;
wherein the sum of the monomers is 100 parts by weight.

In another embodiment, a free radically polymerizable photoinitiator is added to the initial monomer mixture. The presence of pendent photoinitiator groups in the first syrup solute copolymer overcomes the presence of a thiol chain transfer agent by incorporating branch points therein. Upon irradiation in the second polymerization step, the pendent photoinitiator groups photolyse and a new branch commences. The initial monomer mixture comprises 0.1 to 5 parts by weight of free-radically polymerizable photoinitiator, relative to 100 parts by weight total monomer.

The method comprises:
a) partially thermally polymerizing the (meth)acrylic monomer mixture in the presence of a thiol chain transfer agent and a polymerizable photoinitiator to produce a first syrup polymer composition comprising a low $M_w$ solute copolymer having pendent photoinitiator groups and unreacted solvent monomers;
b) quench the thiol chain transfer agent,
c) further thermally polymerize the syrup polymer composition of step b) to produce a second syrup polymer composition comprising the low $M_w$ solute copolymer, a high $M_w$ solute copolymer and unreacted solvent monomers;
d) add a crosslinking agent;
e) further photopolymerize the syrup polymer composition of step d) to produce a second syrup polymer composition comprising the low $M_w$ solute copolymer, and a crosslinked high $M_w$ solute copolymer.

As with the previous methods, the syrup may be coated on a suitable substrate after step c) and further photopolymerized. As the low $M_w$ solute polymer is produced in step a), it is necessary to quench any unreacted chain transfer agent prior to step c) so that the high $M_w$ solute polymer may form. However, in embodiments where the polymerizable photoinitiator is a polymerizable hydrogen-abstraction photoinitiator, it serves as a branching agent to abate or negate the effects of the chain transfer agent so that the second high $M_w$ polymer may be produced. Thus step b) may be quenched by reaction, oxidation or volatilization, or may be omitted as the thiol is effectively quenched by the photoinitiator serving as a branching agent The product of the method will be a mixture of the high- and low $M_w$ dead polymers, and a crosslinked third polymer third polymer having a $M_w$ of 100,000 to 1,000,000 produced in the last polymerization step. If a multiacrylates is used as the crosslinking agent used, only the third polymer may be crosslinked. If a halotriazine or hydrogen-abstraction type crosslinking agent is used, then the high $M_w$ polymer and/or the low $M_w$ polymer may be crosslinked as well.

In another embodiment, a branching agent is added to the first syrup polymer composition. This overcomes the thiol chain transfer agent by providing numerous branch points in the second solute copolymer. The method comprises:
a) partially polymerizing an acrylic monomer mixture in the presence of a thiol chain transfer agent to produce a first syrup polymer composition comprising a low Mw solute copolymer and unreacted solvent monomers;
b) quenching the thiol chain transfer agent
c) adding a branching agent and optional photoinitiator,
d) further polymerizing to produce a composition comprising a low $M_w$ solute copolymer, a high $M_w$ crosslinked solute copolymer, and unreacted solvent monomers.

In some embodiments, a crosslinker is added to the syrup polymer of step d), and further photopolymerized.

In another embodiment, a polymerizable photoinitiator is added to the first syrup polymer composition. This overcomes the thiol chain transfer agent by providing numerous branch points in the second solute copolymer, similar to the addition of a branching agent. The method
a) partially polymerizing an acrylic monomer mixture in the presence of a thiol chain transfer agent to produce a first syrup polymer composition comprising a low $M_w$ solute copolymer and unreacted solvent monomers;
b) quench the thiol chain transfer agent,
c) add a polymerizable photoinitiator to the syrup polymer of step b), and
d) further photopolymerize the syrup polymer composition of step c) to produce a second syrup polymer composition comprising the low Mw solute copolymer, a high $M_w$ solute copolymer having pendent photoinitiator groups, and unreacted solvent monomers;
e) optionally add a crosslinker to the syrup polymer composition of step d); and
f) further photopolymerize.

The polymerizable photoinitiator is added in amount of 0.1 to 5 parts by weight, relative to 100 parts by weight total monomer, to the syrup polymer composition of step c). Optionally the syrup of step c) may be fully photopolymerized in step d).

In some preferred embodiments, a polymerizable hydrogen-abstraction photoinitiator to the first syrup, which may then be further photopolymerized to produce a second syrup copolymer comprising a low $M_w$ (meth)acrylate solute polymer, a high $M_w$ (meth)acrylate solute copolymer and unreacted solvent monomer In another embodiment, a dialkylaminoalkyl (meth)acrylate is added, such as dimethylaminoethyl acrylate, to the additional monomer mixture to produce a first solute copolymer having pendent dialkylaminoalkyl groups. The pendent amino groups catalyze the Michael addition of the thiol chain transfer agent to unreacted solvent monomers. As previously described, the presence of acid functional monomer units may overcome the amount of amine groups in the aminoalkyl containing monomer units, and one may use the t-butyl acrylate monomers as previously described. The (meth)acrylate monomer mixture comprises:

a) 50-99.9 parts by weight of (meth)acrylate ester monomers;
b) 0.1-15 parts by weight of acid-functional monomers;
c) greater than 0 to 50 parts by weight of (other) polar monomers, said polar monomers comprising dialkylaminoalkyl (meth)acrylate monomers, wherein the sum of the monomers is 100 parts by weight.

The monomer mixture comprises 1 to 10 parts by weight, preferably 1-5 parts by weight, of dialkylaminoalkyl (meth)acrylate monomers, and the first syrup copolymer comprises pendent aminoalkyl groups which catalyze the Michael addition of the thiol chain transfer agent to unreacted acrylate monomers to quench the chain transfer agent.

In some embodiments, the monomer mixture further comprises t-butyl acrylate monomers, as described supra. The monomer mixture comprising 0.1 to 15 parts by weight of t-butyl acrylate monomers and less than 1 parts by weight of acid-functional monomers In some embodiments, the he monomer mixture comprises functional acrylate monomer having a nucleophilic or electrophilic functional group to produce a first solute copolymer having pendent electrophilic our nucleophilic functional groups. These pendent functional groups may be further functionalized by reaction with a compound having co-reactive functionality. For example, the first or second solute copolymer may be provided with a pendent photoinitiator group, an ethylenically unsaturated group, or an alkoxysilane group.

In some embodiments 1) the functional groups of the first solute copolymer are reacted with a photoinitiator having co-reactive functional groups to produce a solute copolymer having pendent photoinitiator groups, 2) the functional groups of the first solute copolymer are reacted with a unsaturated compound having co-reactive functional groups to produce a solute copolymer having pendent unsaturated groups, or 3) the functional groups of the first solute copolymer are reacted with an alkoxysilane compound having co-reactive functional groups to produce a solute copolymer having pendent alkoxysilane groups.

With each of the methods, the second solute copolymer may be combined with a crosslinker, coated on a substrate and further cured to produce a pressure-sensitive adhesive article.

The monomer mixture for the methods includes (meth)acrylate ester monomers, acid-functional monomers, and optionally non-acid functional polar monomers. Generally, the monomers are chosen such the resulting (co)polymers have a $T_g \leq 20°$ C., preferably $\leq 0°$ C., as estimated by the Fox equation.

The crosslinking agent may be a multifunctional (meth)acrylate such as hexanediol diacrylate, a halotriazine or a hydrogen-abstraction crosslinking agent, as described herein.

The (meth)acrylate ester monomer useful in preparing the monomer mixture is a monomeric (meth)acrylic ester of a non-tertiary alcohol, which alcohol contains from 1 to 14 carbon atoms and preferably an average of from 4 to 12 carbon atoms.

Examples of monomers suitable for use as the (meth)acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, cyclohexanol, 3-heptanol, 1-octanol, 2-octanol, isooctylalcohol, 2-phenylethanol, 2-ethyl-1-hexanol, 1-decanol, 2-propylheptanol, (iso)borneol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof, although combinations of two or more different (meth)acrylate ester monomer are suitable. In some embodiments, the preferred (meth)acrylate ester monomer is the ester of (meth)acrylic acid with an alcohol derived from a renewable source, such as 2-octanol, citronellol, dihydrocitronellol.

In some embodiments it is desirable for the ultimate copolymer to include a low $T_g$ monomer. Suitable low $T_g$ monomers include have one ethylenically unsaturated group and a glass transition temperature of less than 0° C. (as estimated by the Fox Equation), which are suitable in the present invention include, for example, n-butyl acrylate, isobutyl acrylate, hexyl acrylate, 2-ethyl-hexylacrylate, isooctylacrylate, caprolactoneacrylate, isodecylacrylate, tridecylacrylate, laurylmethacrylate, methoxy-polyethylenglycol-monomethacrylate, laurylacrylate, tetrahydrofurfurylacrylate, ethoxy-ethoxyethyl acrylate and ethoxylated-nonylacrylate. Especially preferred are 2-ethylhexylacrylate, ethoxy-ethoxyethyl acrylate, tridecylacrylate and ethoxylated nonylacrylate.

In some embodiments it is desirable for the ultimate copolymer to include a high $T_g$ monomer, have a $T_g$ of at least 25° C., and preferably at least 50° C. Suitable high $T_g$ monomers include Examples of suitable monomers useful in the present invention include, but are not limited to, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5 trimethylcyclohexyl acrylate, cyclohexyl acrylate, N-octyl acrylamide, and propyl methacrylate or combinations.

The (meth)acrylate ester monomer is present in an amount of 50 to 99.9 parts by weight based on 100 parts total monomer content used to prepare the copolymer. Preferably (meth)acrylate ester monomer is present in an amount of 70 to 99 parts by weight, most preferably 80 to 95 parts by weight, based on 100 parts total monomer content. In some embodiments the copolymers may comprise 100% (meth)acrylate ester monomers if selected such that the resulting polymer has the desired $T_g$, as estimated by the Fox equation.

The (meth)acryloyl copolymer further comprises an acid functional monomer, where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. The acid functional monomer, when present, is generally used in amounts of 0.1 to 15 parts by weight, preferably 1 to 10 parts by weight, based on 100 parts by weight total monomer.

In the methods of the invention, the chain transfer agent is quenched after the first polymerization to prepare the first syrup polymer composition comprising the low Mw copolymer. In embodiments where the thiol chain transfer agent is quenched by addition of an amine (which catalyzes a Michael addition reaction), it is desirable to minimize the amount of acid-functional monomer in the initial monomer mix. In order to provide sufficient amine to catalyze the Michael addition and quench the thiol chain transfer agent, the amount of amine would have to be used in molar excess of the amount of acid functional monomer. Desirable, when quenching the thiol chain transfer agent with an amine, the amount of acid functional monomer is less than 1 part by weight, relative to 100 parts by weight total monomer.

In such embodiments, it is advantageous to include t-butyl acrylate in the acrylate ester monomer mixture. The t-butyl group serves as a protected acrylic acid group that may be subsequently liberated by addition of acid. Thus, t-butyl acrylate may be used in any of the method to produce a copolymer having pendent t-butyl ester groups. A catalytic amount of acid, such as trifluoroacetic, hydrolyses the t-butyl groups to yield a copolymer having pendent acid groups. The t-butyl acrylate may be used in amounts such that the desired amount of acrylic acid monomer unit in the copolymer is achieved, i.e. 0.1 to 15 parts by weight.

Alternatively, the amount of acid-functional monomer in the initial monomer mixture is less than 1 part by weight, the mixture polymerized in the presence of a thiol chain transfer agent, the agent is quenched, and additional acid functional monomer is used in the second polymerization step so that the total is 0.1 to 15 parts by weight.

In another embodiment, the acid functional monomer is used in amounts of 0.1 to 15 parts by weight, partially polymerized to produce the first syrup polymer composition, and the thiol chain transfer agent is quenched by means other than initiating a Michael addition reaction catalyzed by an amine. For example, a branching agent may be introduced to the first syrup polymer composition.

The polar monomers useful in preparing the copolymer are both somewhat oil soluble and water soluble. As used herein the term "polar monomers" are inclusive of acid functional monomers. The term "non-acid functional polar monomers" is exclusive of acid functional monomers.

Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth) acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone. The polar monomer may be present in amounts of 0 to 40 parts by weight, preferably 0.5 to 30 parts by weight, based on 100 parts by weight total monomer.

The monomer mixture may further include other vinyl monomers. When used, vinyl monomers useful in the (meth)acrylate polymer include vinyl esters (e.g., vinyl acetate and vinyl propionate), styrene, substituted styrene (e.g., α-methyl styrene), vinyl halide, and mixtures thereof. As used herein vinyl monomers are exclusive of acid functional monomers, acrylate ester monomers and polar monomers. Such vinyl monomers are generally used at 0 to 5 parts by weight, preferably 1 to 5 parts by weight, based on 100 parts by weight total monomer.

In summary, the monomer mixture generally comprises:
a) 50-99 parts by weight of (meth)acrylate ester monomers;
b) 1-50 parts by weight of polar monomers, inclusive of acid-functional monomers
wherein the sum of the monomers is 100 parts by weight.

When acid functional monomers re present, the monomer mixture comprises:
a) 50-99 parts by weight of (meth)acrylate ester monomers;
b) 0.1-15 parts by weight of acid-functional monomers;
c) 0 to 50 parts by weight of non-acid functional polar monomers,
wherein the sum of the monomers is 100 parts by weight.

In the first polymerization step of the method, an initiator is added to the monomer mixture and polymerized to a conversion rate of 5 to 40% to produce a copolymer having a $M_w$ of 300 to 300,000, preferably to a $M_w$ of 5000 to 250,000. By conversion rate, it refers to the wt. % of the monomers is polymerized. The degree of conversion of the monomer mixture to the syrup polymer can be monitored during the irradiation by measuring the index of refraction of the polymerizing medium. Higher degrees of conversion are often employed, and the resulting syrup polymer composition diluted by additional monomer. The added monomer may be the same monomer mixture or a different monomer mixture.

In the first polymerization step, thermal or photoinitiators may be used, unless otherwise limited. If a polymerizable photoinitiator such as VAZPIA is used in the initial monomer mixture, a thermal initiator is used in the first polymerization step.

Thermal initiators useful in preparing the polymers used in the present invention are initiators that, on exposure to heat, generate free-radicals which initiate (co)polymerization of the monomer mixture. Suitable initiators include but are not limited to those selected from the group consisting of azo compounds such as VAZO™ 64 (2,2'-azobis(isobutyronitrile)) and VAZO™ 52 (2,2'-azobis(2,4-dimethylpentanenitrile)), both available from E.I. du Pont de Nemours Co., peroxides such as benzoyl peroxide and lauroyl peroxide, and mixtures thereof. The preferred oil-soluble thermal initiator is (2,2'-azobis(isobutyronitrile)).

Alternatively, photoinitiators may be used in the first polymerization step. The free-radical photoinitiators which are suitable preferably include both type I and preferably type II photoinitiators.

Type I photoinitiators are defined to essentially undergo a unimolecular bond cleavage reaction upon irradiation thereby yielding free-radicals. Suitable type I photoinitiators are selected from a group consisting of benzoin ethers, benzil ketals, α-dialkoxyacetophenones, α-hydroxyalkylphenones and acylphosphine oxides. Suitable type I photoinitiators are commercially available, for example, as Esacure™ KIP 100 from Lamberti Spa, Gallarate, Italy, or as Irgacure™ 651 from Ciba-Geigy, Lautertal, Germany.

Type II photoinitiators are defined to essentially undergo a bimolecular reaction where the photoinitiators interact in an excited state with a second compound acting as co-initiator, to generate free-radicals. Suitable type II photoinitiators are selected from a group comprising benzophenones, thioxanthones and titanocenes. Suitable co-initiators are preferably selected from a group comprising amine functional monomers, oligomers or polymers whereby amino functional monomers and oligomers are preferred. Both primary, secondary and tertiary amines can be used whereby tertiary amines are preferred. Suitable type II photoinitiators are commercially available, for example, as Esacure™ TZT from Lamberti Spa., Gallarate, Italy, or as 2- or 3-methyl-benzophenone from Aldrich Co., Milwaukee, Wis. Suitable amine co-initiators are commercially available, for example, as GENOMER™ 5275 from Rahn AG, Zurich, Switzerland.

Initiators may comprise from about 0.001 to 0.1 parts by weight, preferably about 0.01 to 0.1 parts by weight based on 100 parts by weight of monomer components in the pressure-sensitive adhesive. The amount of initiator will depend, in part on the reactivity of the monomers. Low $M_w$ polymers will require higher amounts of initiator.

A thiol chain transfer agent is added to the monomer mixture or syrup polymer composition to reduce the molecular weight of the solute copolymer in the syrup polymer composition. The preferred chain transfer agents are isooctylthioglycolate or ethylhexyl mercaptopropionate. The chain transfer agent may be used in amounts such that the low $M_w$ copolymer has a $M_w$ of less than 300,000, and preferable less than 100,000. The monomer mixture may further comprise up to about 5 parts by weight of a chain transfer agent, typically about 0.05 to about 3 parts by weight, if used, preferably about 0.15 parts by weight to about 2 parts by weight, based upon 100 parts by weight of the total monomer mixture.

When using a chain transfer agent, the syrup polymer composition is generally polymerized to higher conversions, than in the absence of chain transfer agents. The conversions may be as high as 50 wt. %, but is generally 5 to 40 wt. % when preparing the low Mw copolymer. This results in copolymers having generally lower molecular weights. The low $M_w$ copolymer resulting from thermal polymerization in the presence of a chain transfer agent is a dead copolymer, and does not copolymerize with additional monomer in the subsequent polymerization steps. Conversion of 0.1 to 25% are used when preparing the high Mw copolymer.

The syrup polymer compositions is treated with an amine to quench any remaining chain transfer agent. In general, when a chain transfer agent is used to produce the low $M_w$ copolymer, the chain transfer agent must be quenched to allow the preparation of the igh Mw copolymer. The thiol chain transfer agent is quenched by addition of a tertiary amine, which catalyzes the Michael addition of the thiol to unreacted solvent acrylate monomers. In some preferred embodiments, the starting monomer mixture comprises aminoalkyl (meth)acrylates, which may be polymerized to produce a copolymer having pendent aminoalkyl groups. It has been found that the rate of polymerization is fast relative to the rate by which the pendent aminoalkyl groups catalyze the Michael addition of the thiol to unreacted solvent acrylate monomers. Therefore the first polymerization step may occur in the presence of the chain transfer agent to produce the first syrup composition comprising the low $M_w$ solute copolymer, solvent monomers and thiol chain transfer agent. Upon standing, the Michael addition occurs depleting the first syrup polymer composition in thiol. This depleted syrup polymer composition may then be combined with a crosslinking agent, and further photopolymerized.

In some embodiments, a branching agent may be used to quench the chain transfer agent. Branching can be achieved through the use of multifunctional monomers in quantities not sufficient to give fully crosslinked. While the use of such monomers would typically lead to crosslinked polymers that would, the use of such monomers in low concentration can quench the chain transfer agents and lead to highly branched polymers of sufficient high Mw. Branching can also be effected by the use of a polymerizable photoinitiator that undergo alpha cleavage, such as VAZPIA. Reference may be made to Sherringtion et al. *Facile, versatile and cost effective route to branched polymers*, Polymer 41 (2000) 6027-31.

Branching agents may include monomers have two or more ethylenically unsaturated groups of unequal activity such as alkenyl (meth)acrylates such as allyl (meth)acrylate, crotyl (meth)acrylate, 1-hexenyl (meth)acrylate, undecenoyl (meth)acrylate, allyloxyphenyl (meth)acrylate, 2-allyloxyethyl (meth)acrylate and the like. The preferred branching agent is allyloxy (meth)acrylate.

Branching agents may also include multifunctional ethylenically unsaturated monomers. Examples of such multifunctional ethylenically unsaturated monomers include, for example, multifunctional (meth)acrylate monomers. Multifunctional (meth)acrylates include tri(meth)acrylates and di(meth)acrylates (that is, compounds comprising three or two (meth)acrylate groups). Typically di(meth)acrylate monomers (that is, compounds comprising two (meth)acrylate groups) are used. Useful tri(meth)acrylates include, for example, trimethylolpropane tri(meth)acrylate, propoxylated trimethylolpropane triacrylates, ethoxylated trimethylolpropane triacrylates, tris(2-hydroxy ethyl)isocyanurate triacrylate, and pentaerythritol triacrylate. Useful di(meth) acrylates include, for example, ethylene glycol di(meth) acrylate, diethylene glycol di(meth)acrylate, triethylene glycol di(meth)acrylate, tetraethylene glycol di(meth)acrylate, 1,4-butanediol di(meth)acrylate, 1,6-hexanediol di(meth) acrylate, alkoxylated 1,6-hexanediol diacrylate, tripropylene glycol diacrylate, dipropylene glycol diacrylate, cyclohexane dimethanol di(meth)acrylate, alkoxylated cyclohexane dimethanol diacrylates, ethoxylated bisphenol A di(meth)acrylates, neopentyl glycol diacrylate, polyethylene glycol di(meth)acrylates, polypropylene glycol di(meth) acrylates, and urethane di(meth)acrylates. The branching agent 1,6-hexanediol diacrylate (HDDA) is particularly suitable. Typically the di(meth)acrylate branching agent is used in amounts ranging from 0.001 to 0.05 parts by weight per 100 parts by weight of (meth)acrylate monomers.

In some of the described methods, the monomer mixture is polymerized in the presence of a chain transfer agent to produce a first syrup polymer composition comprising a low Mw solute copolymer and unreacted monomers. To this syrup is added a polymerizable photoinitiator, then further polymerized to produce a second syrup comprising both low- and high Mw solute copolymers, and unreacted monomer. Crosslinking agents may be added and the syrup further photopolymerized.

In some of the described methods, the initial monomer mixture comprises a polymerizable photoinitiator to produce a first solute copolymer having pendent photoinitiator groups. The monomer mixture of the first or second syrup composition may comprise 0.1 to 5 parts by weight of free-radically polymerizable photoinitiator, relative to 100 parts by weight total monomer.

The photoinitiator monomers, or polymerizable photoinitiators, include an acryloyl group and a photoinitiator group, which may be a hydrogen-abstracting type or an α-cleavage-type photoinitiator group, and may be represented by the formula:

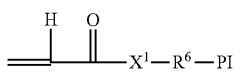

III where;

$X^1$ is —O— or —$NR^3$, $R^3$ is independently H or $C_1$-$C_4$ alkyl;

$R^6$ is a divalent linking group connecting the acrylate group with the PI group; and PI is a photoinitiator represented by the structure:

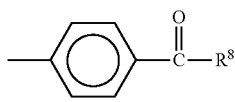

XII, wherein $R^8$ is

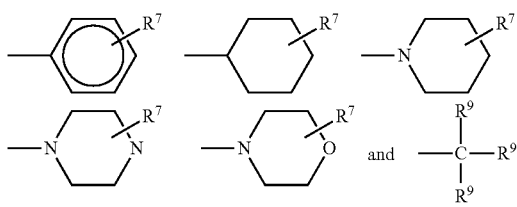

wherein $R^7$ is H or a $C_1$ to $C_4$ alkyl group, each $R^9$ is independently a hydroxyl group, a phenyl group, a $C_1$ to $C_6$ alkyl group, or a $C_1$ to $C_6$ alkoxy group. Such photoinitiator monomers are described, for example, in U.S. Pat. No. 5,902,836 (Babu et al.) and U.S. Pat. No. 5,506,279 (Babu et al.). Further details regarding the linking $R^6$ group may be found with reference to the method of preparing the photoinitiator grafting monomer herein, and in the cited references.

In certain preferred embodiments, the photoinitiator monomers may be of the hydrogen-abstraction type represented by the general formula:

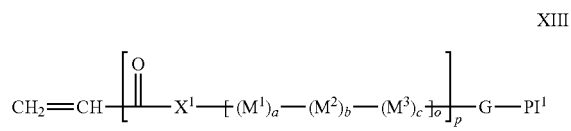

XIII $X^1$ is O or NH;

p is 0 or 1;

o is 0 or an integer from 1 to 5;

a, b, and c are independently 0 or 1;

$M^1$ is $CH_2$ or $Si(R^1)_2$;

$M^2$ is $C(R^1)_2$ or $Si(R^1)_2$;

$M^3$ is —O—, —NH—, —C(O)—, —C(O)O—, —C(O)NH—, or —OC(O)NH—;

Each $R^1$ is independently H or a $C_1$ to $C_4$ alkyl group;

G is a covalent bond, —$(CH_2)_d$—, or —$(CH_2)_d$O— where d is an integer from 1 to 4, preferably from 1 to 2;

$PI^1$ is a radiation-sensitive hydrogen abstracting group having the general formula:

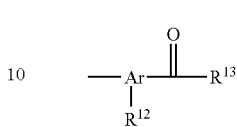

XIV in which Ar is a substituted arene having 6 to 12 carbon atoms, preferably a benzenetriyl group;

$R^{12}$ is hydrogen, a $C_1$ to $C_{12}$ alkyl group, a $C_1$ to $C_{12}$ alkoxy group, or a phenyl group; and $R^{13}$ is a $C_1$ to $C_6$ alkyl group, a cycloalkyl group having 3 to 14 carbon atoms, or

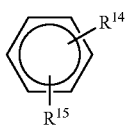

wherein $R^{14}$ and $R^{15}$ are independently selected from hydrogen, $C_1$ to $C_{12}$ alkyl groups, $C_1$ to $C_{12}$ alkoxy groups, and phenyl groups.

Included among those hydrogen abstracting photoinitiator monomers encompassed by Formula XIII are those where $PI^1$ is a moiety derived from one of the following compounds (or a substituted derivative thereof), the bond to G is preferably located para to the bridging carbonyl group: benzopheneone, anthraquinone, 5,12-naphthacenequinone, aceanthracenequinone, benz(A)anthracene-7,12-dione, 1,4-chrysenequinone, 6,13-pentacenequinone, 5,7,12,14-pentacenetetrone, 9-fluorenone, anthrone, xanthone, thioxanthone, acridone, dibenzosuberone, acetophenone, and chromone. The synthesis of the formula XIII monomers is described in U.S. Pat. No. 5,773,485 (Bennett et al).

A preferred photoinitiator monomer is 2-propenoylaminoethanoic acid, 2-(4-(2-hydroxy-2 methylpropanoyl)phenoxy)ethyl ester, "VAZPIA" prepared according to Example 1 of U.S. Pat. No. 5,506,279 (Babu et al.).

The photoinitiator monomers may be prepared by the reaction between a polymerizable monomer having a reactive functional group with a photoinitiator compounds having a co-reactive functional group.

Representative examples of useful polymerizable monomers having a reactive functional group include acrylic acid, hydroxyalkyl (meth)acrylates such as 2-hydroxyethyl (meth)acrylate and 2-(2-hydroxyethoxy)ethyl (meth)acrylate; aminoalkyl (meth)acrylates such as 3-aminopropyl (meth)acrylate and 4-aminostyrene; oxazolinyl compounds such as 2-ethenyl-1,3-oxazolin-5-one and 2-propenyl-4,4-dimethyl-1,3-oxazolin-5-one; carboxy-substituted compounds such as (meth)acrylic acid and 4-carboxybenzyl (meth)acrylate; isocyanato-substituted compounds such as isocyanatoethyl (meth)acrylate and 4-isocyanatocyclohexyl (meth)acrylate; epoxy-substituted compounds such as glycidyl (meth)acrylate; aziridinyl-substituted compounds such as N-acryloylaziridine and 1-(2-propenyl)-aziridine; and acryloyl halides such as (meth)acryloyl chloride.

Representative examples of photoinitiator compounds having a co-reactive functional group include compounds such as 1-(4-hydroxyphenyl)-2,2-dimethoxyethanone, 1-[4-(2-hydroxyethyl)phenyl]-2,2-dimethoxyethanone, (4-isocyanatophenyl)-2,2-dimethoxy-2-phenylethanone, 1-{4-[2-(2,3-epoxypropoxy)phenyl]}-2,2-dimethyl-2-hydroxyethanone, 1-[4-(2-aminoethoxy)phenyl]-2,2-dimethoxyethanone, and 1-[4-(carbomethoxy)phenyl]-2,2-dimethoxyethanone. Such photoinitiator monomers (and polymeric photoinitiators derived therefrom) are described, for example, in U.S. Pat. No. 5,902,836 (Babu et al.) and U.S. Pat. No. 5,506,279 (Babu et al.), the disclosures of which are herein incorporated by reference.

Preferred photoinitiators are photoactive compounds that undergo a Norrish I cleavage to generate free radicals that can initiate by addition to the acrylic double bonds. Norrish type 1 photocrosslinkers, especially α-cleavage type photoinitiators, are preferred.

Alternatively to using a polymerizable photoinitiator, the monomer mixture can included a functional monomer that may be polymerized subsequently functionalized with a photoinitiator group to yield a low Mw solute copolymer having pendent photoinitiator groups. For example, the initial monomer mixture may contain hydroxyalkyl or aminoalkyl (meth)acrylate monomers. Partial polymerization thereof yields a copolymer having pendent hydroxyalkyl or aminoalkyl copolymers that may be subsequently functionalized with a compound having a photoinitiator group, and a functional group that is co-reactive with the pendent functional groups of the copolymer.

The weight percentage of the photoinitiator monomers of in the syrup composition may be at least about 0.1 parts by weight, and generally less than about 10 parts by weight, relative to the 100 parts total weight of monomers and low $M_w$ solute copolymer.

As described, the first solute copolymer may be provided with a pendent photoinitiator groups by functionalization of the solute copolymer. The monomer mixture is provided with a monomer having an electrophilic or nucleophilic functional group, to provide a pendent functional group to the solute copolymer. This is then reactive with a photoinitiator having a co-reactive functional group. Similarly, the solute copolymer may be provide with a polymerizable, ethylenically unsaturated group, such as an alkenyl group or a (meth)acrylate group, or may be provided with an alkoxysilane group.

To provide pendent unsaturation, representative examples of useful co-reactive compounds include hydroxyalkyl (meth)acrylates such as 2-hydroxyethyl (meth)acrylate and 2-(2-hydroxyethoxy)ethyl (meth)acrylate; aminoalkyl (meth)acrylates such as 3-aminopropyl (meth)acrylate and 4-aminostyrene; oxazolinyl compounds such as 2-ethenyl-1,3-oxazolin-5-one and 2-propenyl-4,4-dimethyl-1,3-oxazolin-5-one; carboxy-substituted compounds such as (meth)acrylic acid and 4-carboxybenzyl (meth)acrylate; isocyanato-substituted compounds such as isocyanatoethyl (meth)acrylate and 4-isocyanatocyclohexyl (meth)acrylate; epoxy-substituted compounds such as glycidyl (meth)acrylate; aziridinyl-substituted compounds such as N-acryloylaziridine and 1-(2-propenyl)-aziridine; and acryloyl halides such as (meth)acryloyl chloride. Similarly, the solute copolymer may be provided with alkoxysilane groups by reaction with isocyanatoethyl trimethoxysilane.

For further description regarding the functionalization of acrylate copolymers see U.S. Pat. No. 7,838,110 (Kavanagh et al.), U.S. Pat. No. 8,507,612 (Zhu et al.) U.S. Pat. No. 6,448,301 (Babu et al.) and U.S. Pat. No. 7,459,489 (Lewandowski et al.), each incorporated herein by reference.

In the methods, the syrup polymer composition is further compounded with a crosslinking agent, typically a photosensitive crosslinking agent. The crosslinking agents are generally halomethyl triazines, hydrogen-abstraction crosslinking agent or multifunctional acrylates.

The halomethyl-1,3,5-triazine crosslinking agents are found to be highly efficient and reliable UV crosslinkers. They are oxygen tolerant, have scavenging ability, and have been found to cure the instant compositions under low intensity light irradiation. Without being bound by theory, it is believed that the halomethyl triazine crosslinking agent functions by hydrogen abstraction of the copolymer followed by radical-radical coupling. Alternatively, the halomethyl-1,3,5-triazine per se may function as a crosslinking agent, whereby a halomethyl radical is generated, which may abstract a proton from the copolymer, or couple with a radical on the copolymer. The result may be a crosslinked acrylate copolymer of the general structure:

Acrylate copolymer —$CX_2$-Triazine-$CX_2$-Acryalte copolymer, where X is halogen as described below.

As the hydrogen abstraction is non-selective, the halomethyl triazine will crosslink the first high Mw copolymer, the second low Mw copolymer, and the copolymer resulting from the remaining monomers of the second syrup composition.

The halomethyl-1,3,5-triazine is of the general formula:

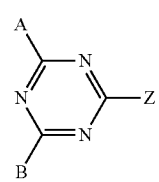

III wherein
A is a mono-, di-, or trihalomethyl, preferably trichloromethyl
B is A, —$N(R^1)_2$, —$OR^1$, $R^1$, L-$R^{sensitizer}$ or -L-$R^{PI}$, where $R^1$ is H, or preferably alkyl or aryl;
Z is a conjugated chromophore, L-$R^{sensitizer}$ or -L-$R^{PI}$,
L is a covalent bond or a (hetero)hydrocarbyl linking group. Preferably, A and B are trihalomethyl, more preferably trichloromethyl.

In one embodiment, the halomethyl-1,3,5-triazine is as described in U.S. Pat. No. 4,330,590 (Vesley), and is of the formula:

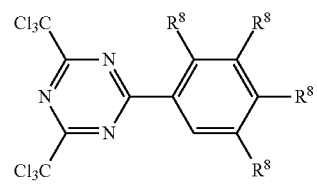

wherein: each $R^8$ is independently hydrogen, alkyl, or alkoxy; and 1-3 of the $R^8$ groups are hydrogen. Preferably, the alkyl and alkoxy groups have no more than 12 carbon atoms, and often no more than 4 carbon atoms. Preferably, one or two of the meta- and/or para-$R^8$ groups are alkoxy, because this tends to provide shorter reaction times. Adjacent alkoxy substituents may be interconnected to form a ring. The triazine component may be prepared by the co-trimerization of an aryl nitrile with trichloroacetonitrile in the presence of HCl gas and a Lewis acid such as AlCl$_3$, AlBr$_3$, etc., as described in *Bull. Chem. Soc. Japan*, Vol. 42, page 2924 (1969).

In another embodiment, the halomethyl-1,3,5-triazine is as described in U.S. Pat. No. 4,329,384 (Vesley), and is of the formula:

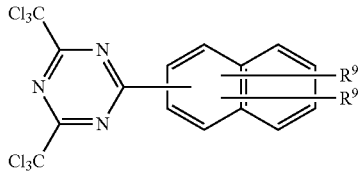

wherein each R$^9$ is independently hydrogen, alkyl, or alkoxy. By this representation, it is meant that R$^9$ groups can be on either of the fused rings. Preferably, any alkyl or alkoxy group of the photoactive s-triazine component has no more than 12 carbon atoms, and no more than two alkyl and alkoxy groups have more than 6 carbon atoms. In certain embodiments, they have no more than 4 carbon atoms, and the alkyl is often methyl or ethyl, and the alkoxy is often methoxy or ethoxy. Adjacent alkoxy substituents may be interconnected to form a ring. The halomethyl triazine component may be prepared by the co-trimerization of a polynuclear nitrile with trichloroacetonitrile in the presence of HCl gas and a Lewis acid such as AlCl$_3$, AlBr$_3$, etc. as described in *Bull. Chem. Soc. Jap.*, Vol. 42, pages 2924-2930 (1969).

Examples of suitable halomethyl-1,3,5-triazines agents include, but are not limited to, 2,4-bis(trichloromethyl)-6-(4-methoxy)phenyl)-s-triazine; 2,4-bis(trichloromethyl)-6-(3,4-dimethoxy)phenyl)-s-triazine; 2,4-bis(trichloromethyl)-6-(3,4,5-trimethoxy)phenyl)-s-triazine; 2,4-bis(trichloromethyl)-6-(2,4-dimethoxy)phenyl)-s-triazine; 2,4-bis(trichloromethyl)-6-(3-methoxy)phenyl)-s-triazine as described in U.S. Pat. No. 4,330,590 (Vesley), and 2,4-bis(trichloromethyl)-6-naphthenyl-s-triazine and 2,4-bis(trichloromethyl)-6-(4-methoxy)naphthenyl-s-triazine as described in U.S. Pat. No. 4,329,384 (Vesley).

The halomethyl triazine further will crosslink the polymer resulting from polymerization of unreacted solvent solvent monomers, and will further crosslink the high Mw solute polymer. The triazine may further crosslink the low Mw solute polymer, but the degree of crosslinking is a function of the M$_w$, with polymers having Mw below about 200,000 being minimally crosslinked. When using halomethyl triazines, the adhesive polymer may be described as a mixture the high M$_w$ polymer, the third polymer third polymer having a M$_w$ of 100,000 to 1,000,000, and optionally the low M$_w$ polymer are all crosslinked.

As an alternative to the halomethyltriazines, multifunctional acrylates may be used in step c). Multifunctional acrylates are particularly useful for syrup polymerization. As the crosslinking reaction is selective, the multifunctional acrylates will crosslink only the copolymer resulting from the remaining monomers of the second syrup composition, while the first high M$_w$ copolymer, and the second low M$_w$ copolymer remain uncrosslinked.

Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition.

Unlike the halomethyl triazine and hydrogen abstraction crosslinking agents, the multifunctional acrylate will not crosslink the high- and low M$_w$ dead polymers of the syrup. The adhesive polymer may be described as a mixture the high M$_w$ polymer, the low M$_w$ polymer the third polymer of intermediate M$_w$, third polymer having a M$_w$ of 100,000 to 1,000,000, wherein only the third polymer is crosslinked.

The crosslinking agent may also include a hydrogen-abstraction type crosslinking agent including a benzophenone photocrosslinking agent, and either an anthraquinone photocrosslinking agent or a thioxanthone photocrosslinking agent or both an anthraquinone photocrosslinking agent and a thioxanthone photocrosslinking agent.

The benzophenone photocrosslinker may be a multi-functional benzophenone of the general formula:

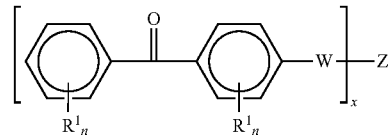

wherein:

W is —O—, —NH—, or —S—;

Z represents (hetero)hydrocarbyl organic spacer group, preferably selected from the group consisting of alkyl, aryl, aralkyl, heteroaryl, and optionally containing ester, amide, urethanes, and urea functional groups.

x is at least 2, preferably 2-6;

each R$^1$ is independently selected from C$_1$-C$_{12}$ alkyl, C$_1$-C$_{12}$ alkyloxy, C$_1$-C$_{12}$ alkylthio, aryl, aryloxy, arylthio, nitrile and halide, and n is 0 to 4. In one preferred embodiment, W is —O—; Z is —(CH$_2$)$_{2-12}$—; and n is 2.

Specific examples of multi-functional benzophenones include 1,5-bis(4-benzoylphenoxy)pentane,1,9-bis(4-benzoylphenoxy)nonane, and 1,11-bis(4-benzoylphenoxy)undecane.

In an alternate embodiment, the benzophenone photocrosslinker is a monobenzophenone of the formula:

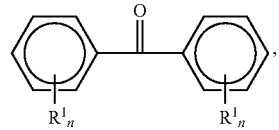

wherein each R$^1$ is independently selected from C$_1$-C$_{12}$ alkyl, C$_1$-C$_{12}$ alkyloxy, C$_1$-C$_{12}$ alkylthio, aryl, aryloxy, arylthio, nitrile and halide.

Specific examples of monofunctional benzophenones include benzophenone, 4-phenylbenzophenone, 4-methoxybenzophenone, 4,4'-dimethoxybenzophenone, 4,4'-dimethylbenzophenone, 4-methylbenzophenone, 4-(2-hydroxyethylthio)-benzophenone, and 4-(4-tolylthio)-benzophenone.

The anthraquinone photocrosslinker is of the formula

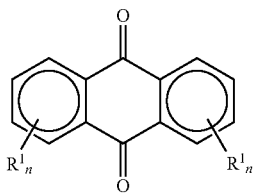

where each $R^1$ is independently selected from $C_1$-$C_{12}$ alkyl, $C_1$-$C_{12}$ alkyloxy, $C_1$-$C_{12}$ alkylthio, aryl, aryloxy, arylthio, nitrile and halide, and n is 0 to 4.

Representative examples of useful anthraquinone photocrosslinkers include anthraquinone, 2-methyl anthraqinone, 2-t-butyl anthraquinone, 2-ethyl anthraquinone, 2-phenyl anthraquinone, 1,4-dimethyl anthraquinone, 2,3-dimethyl anthraqinone, 1,2-dimethyl anthraqinone, 1-methoxy-2-methyl anthraquinone, 2-acetyl anthraquinone, and 2,6-di-t-butyl anthraquinone.

The thioxanthone photocrosslinker is of the formula:

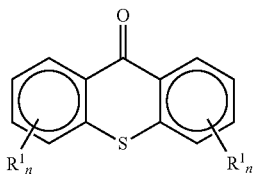

where each $R^1$ is independently selected from $C_1$-$C_{12}$ alkyl, $C_1$-$C_{12}$ alkyloxy, $C_1$-$C_{12}$ alkylthio, aryl, aryloxy, arylthio, nitrile and halide, and n is 0 to 4.

Representative examples of useful thioxanthone photocrosslinkers include thioxanthone, 2-isopropylthioxanthone, 2-chlorothioxanthone, 2-dodecylthioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 1-ethoxycarbonyl-3-(1-methyl-1-morpholinoethyl)-thioxanthone, 2-methyl-6-dimethoxymethylthioxanthone, 2-methyl-6-(1,1-dimethoxybenzyl)-thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 6-ethoxycarbonyl-2-methoxythioxanthone, and 6-ethoxycarbonyl-2-methylthioxanthone Particularly preferred is 2-isopropylthioxanthone. Other preferred thioxanthones include1-chloro-4-propoxythioxanthone,2-propoxythioxanthone, and 4-propoxythioxanthone.

Other useful benzophenone, thioxanthone and anthraquinone chromophores are described in U.S. Pat. No. 6,235,922 (Heilmann et al). The crosslinking of the syrup polymer composition with such crosslinking agents yield a crosslinked adhesive polymer where each of the low $M_w$, the high $M_w$ and the third polymer third polymer having a $M_w$ of 100,000 to 1,000,000 are crosslinked.

The amount and identity of the crosslinking agent is tailored depending upon application of the adhesive composition. Typically, the crosslinking agent is present in amounts less than 5 parts based on total dry weight of adhesive composition. More specifically, the crosslinker may be present in amounts from 0.01 to 5 parts, preferably 0.05 to 1 parts, based on 100 parts total monomers used.

The pressure sensitive adhesives may also contain one or more conventional additives. Preferred additives include tackifiers, plasticizers, dyes, antioxidants, and UV stabilizers. Such additives can be used if they do not affect the superior properties of the pressure sensitive adhesives. Such additive are generally added prior to the final photopolymerization step.

If tackifiers are used, then up to about 40% by weight, preferably less than 30% by weight, and more preferably less than 5% by weight based on the dry weight of the total adhesive polymer would be suitable.

However, for some substrates, particularly low surface energy substrates, the acrylate copolymers may be highly tackified. Low energy substrates are those having a surface energy of less than 40 millinewtons per meter (mN/m), e.g., less than 35 mN/m. Exemplary low surface energy materials include polyolefins such as polypropylene and polyethylene (e.g., high density polyethylene).

In such compositions for low energy substrates the adhesives may comprise 40 to 60% by weight (wt. %) total tackifier content, based on the total weight of all tackifiers divided by the total weight of the acrylic copolymer and all tackifiers.

Suitable tackifiers for use with (meth)acrylate polymer composition include rosin acids, rosin esters, terpene phenolic resins, hydrocarbon resins, and cumarone indene resins. The type and amount of tackifier can affect properties such as contactability, bonding range, bond strength, heat resistance and specific adhesion.

Commercially available tackifiers for the adhesive copolymers include Foral™ 85LB from Hercules, Escorez™ 2520 Liquid aliphatic/aromatic modified tackifing resin, available from Exxon Chemical Co., Houston, Tex., Escorez™ 2101 aliphatic/aromatic hydrocarbon tackifying resin, available from Exxon Chemical Co., Wingtack Plus™ C5 aliphatic aromatically modified tackifying resin, Wingtack Extra™ $C_5$ aliphatic aromatically modified tackifying resin, and Wingtack 10™ Liquid $C_5$ aliphatic tackifying resin, available from Goodyear Chemical, Akron, Ohio, Foral 85™ rosin esters, from Hercules, Inc., Piccotex™ LC-55wk aromatic resins, and Piccotac™ 95 aliphatic resins, both from Hercules, Inc., Piccolyte™ A-115 and Zonarez™ B-100 terpene resins both from Arizona Chemical Co., ECR180™ hydrocarbon resins, from Exxon Chemical Co., and SP 553™ a terpene phenolic tackifier resin, from Schenectady International.

Commercially available tackifiers that are suitable for an aqueous dispersion include Tacolyn™ 1070, 5001 and 5002 (aqueous, 55% solids synthetic resin dispersions based on low molecular weight thermoplastic resins, available from Hercules Inc.), SE1055™ (an aqueous dispersion of a rosin ester, available from Hercules Inc.), Escorez™ 9271 (an aliphatic hydrocarbon resin emulsion, available from Exxon), Dermulsene™ 82, Dermulsene™ 92, Dermulsene™ DT or Dermulsene™ DT50 (aqueous dispersions of modified terpene phenolic resins, available from DRT) and Aquatak™ 4188 (a modified rosin ester, available from Arizona Chemical Company).

The adhesive composition of the present invention may contain a plasticizer, if desired. The plasticizer softens the adhesive, and as a result, the substrate is more easily wetted by the adhesive. Further, the use of a plasticizer may improve the adhesive properties, including peel and shear. The plasticizer may be hydrophobic oils, hydrophilic or a combination thereof. The plasticizer can be added in an amount ranging from about 0.1 to about 20 weight percent of the adhesive composition and preferably from about 0.5 to about 10 weight percent.

Useful plasticizers are compatible with the acrylic pressure sensitive adhesive, such that once the plasticizer is mixed into the acrylic pressure sensitive adhesive, the plasticizer does not phase separate from the pressure sensitive adhesive. By "phase separation" or "phase separate," it is meant that by differential scanning calorimetry (DSC) no detectable thermal transition, such as a melting or glass transition temperature can be found for the pure plasticizer in the plasticized adhesive composition. Some migration of the plasticizer from or throughout the plasticized adhesive can be tolerated, such as minor separation due to composition equilibrium or temperature influences, but the plasticizer does not migrate to the extent that phase separation occurs between the adhesive and the plasticizing agent. Plasticizer compatibility with the adhesive can also be dependent upon the chemical nature of the plasticizer and the monomeric content of the adhesive.

Useful plasticizing agents include polyalkylene oxides having weight average molecular weights of 150 to 5,000, or 150 to 1,500, such as polyethylene oxides, polypropylene oxides, polyethylene glycols, and copolymers thereof; alkyl or aryl functionalized polyalkylene oxides, such as PYCAL™ 94 (a phenyl ether of polyethylene oxide, commercially available from ICI Chemicals); benzoyl functionalized polyethers, such as Benzoflex™ 400 (polypropylene glycol dibenzoate, commercially available from Velsicol Chemicals); monomethyl ethers of polyethylene oxides, Ucon™ 50-HB-400 (polyethylene propylene glycol butyl ethers, commercially available from Dow Chemical) and mixtures thereof. Examples of other useful plasticizing agents include Carbowax™ MPEG 550, a methoxypolyethylene glycol plasticizer having a molecular weight of approximately 550 and available from Union Carbide Corp.; Polyol PPG™ 1025, a polypropylene glycol plasticizer having a molecular weight of approximately 1025 and available from Lyondell Chemical Worldwide, Inc.; Polyol™ PPG 425, a polypropylene glycol plasticizer having a molecular weight of approximately 425 and available from Lyondell Chemical Worldwide, Inc.; and Pluronic™ 25R4, an ethylene oxide/propylene oxide block copolymer plasticizer available from BASF Company.

For non-aqueous compositions oil soluble species such as phthalates (e.g. dioctyl adipate, and bis 2-ethylhexyl adipate), citrates (e.g. trihexyl citrate and trioctyl citrate), adipates (e.g. dioctyl phthalate, and bis 2-ethylhexyl phthalate) and maleates (e.g. dibutyl maleate).

The syrup polymer composition and the photoinitiator may be irradiated with activating UV radiation to polymerize the monomer component(s). UV light sources can be of two types: 1) relatively low light intensity sources such as backlights which provide generally 10 mW/cm$^2$ or less (as measured in accordance with procedures approved by the United States National Institute of Standards and Technology as, for example, with a Uvimap™ UM 365 L-S radiometer manufactured by Electronic Instrumentation & Technology, Inc., in Sterling, Va.) over a wavelength range of 280 to 400 nanometers and 2) relatively high light intensity sources such as medium pressure mercury lamps which provide intensities generally greater than 10 mW/cm$^2$, preferably between 15 and 450 mW/cm$^2$. Where actinic radiation is used to fully or partially polymerize the syrup polymer composition, high intensities and short exposure times are preferred. For example, an intensity of 600 mW/cm$^2$ and an exposure time of about 1 second may be used successfully. Intensities can range from about 0.1 to about 150 mW/cm$^2$, preferably from about 0.5 to about 100 mW/cm$^2$, and more preferably from about 0.5 to about 50 mW/cm$^2$. Such photoinitiators preferably are present in an amount of from 0.1 to 1.0 pbw per 100 pbw of the syrup polymer composition.

Accordingly, relatively thick coatings (e.g., at least about 1 mil or 25.4 micrometers) can be achieved when the extinction coefficient of the photoinitiator is low.

The degree of conversion can be monitored during the irradiation by measuring the index of refraction of the polymerizing medium as previously described. Useful coating viscosities are achieved with conversions (i.e. the percentage of available monomer polymerized) in the range of up to 50%, preferably 5-40% for the first partial polymerization to produce the low Mw copolymer. The molecular weight (weight average) of the low Mw solute polymer(s) is at least 3,000 to 300,000. In the second polymerization step to produce the high Mw copolymer the degree of conversion is for about 0.1 to 25%, prior to the final photopolymerization.

When preparing pressure sensitive adhesives, it is expedient for the photoinitiated polymerization reactions to proceed to virtual completion, i.e., depletion of the monomeric components, at temperatures less than about 70° C. (preferably at 50° C. or less) with reaction times less than 24 hours, preferably less than 12 hours, and more preferably less than 6 hours. These temperature ranges and reaction rates obviate the need for free radical polymerization inhibitors, which are often added to acrylic systems to stabilize against undesired, premature polymerization and gelation. Furthermore, the addition of inhibitors adds extraneous material that will remain with the system and inhibit the desired polymerization of the syrup polymer and formation of the crosslinked pressure sensitive adhesives of the invention.

It is preferable to coat the adhesive composition prior to the final photopolymerization. The adhesive polymer composition, as a syrup, is easily coated upon suitable flexible backing materials by conventional coating techniques, then further polymerized, and cured or dried, to produce adhesive coated sheet materials. The flexible backing material may be any material conventionally utilized as a tape backing, optical film or any other flexible material.

Examples of materials that can be included in the flexible support include polyolefins such as polyethylene, polypropylene (including isotactic polypropylene), polystyrene, polyester, polyvinyl alcohol, poly(ethylene terephthalate), poly(butylene terephthalate), poly(caprolactam), poly(vinylidene fluoride), polylactides, cellulose acetate, and ethyl cellulose and the like. Commercially available backing materials useful in the invention include kraft paper (available from Monadnock Paper, Inc.); cellophane (available from Flexel Corp.); spun-bond poly(ethylene) and poly (propylene), such as Tyvek™ and Typar™ (available from DuPont, Inc.); and porous films obtained from poly(ethylene) and poly(propylene), such as Teslin™ (available from PPG Industries, Inc.), and Cellguard™ (available from Hoechst-Celanese).

Backings may also be prepared of fabric such as woven fabric formed of threads of synthetic or natural materials such as cotton, nylon, rayon, glass, ceramic materials, and the like or nonwoven fabric such as air laid webs of natural or synthetic fibers or blends of these. The backing may also be formed of metal, metallized polymer films, or ceramic sheet materials may take the form of any article conventionally known to be utilized with pressure sensitive adhesive compositions such as labels, tapes, signs, covers, marking indicia, and the like.

The above-described compositions are coated on a substrate using conventional coating techniques modified as appropriate to the particular substrate. For example, these compositions can be applied to a variety of solid substrates by methods such as roller coating, flow coating, dip coating, spin coating, spray coating knife coating, and die coating. These various methods of coating allow the compositions to be placed on the substrate at variable thicknesses thus allowing a wider range of use of the compositions. Coating thicknesses may vary as previously described. The syrup polymers may be of any desirable concentration for subsequent coating, but is typically at a conversion such that a coatable viscosity is reached of having a viscosity of from 500 to 10,000 cPs (centipoise) at 22° C. The desired concentration may be achieved by further dilution of the coating composition, or by partial drying.

The flexible support may also comprise a release-coated substrate. Such substrates are typically employed when an adhesive transfer tape is provided. Examples of release-coated substrates are well known in the art and include, by way of example, silicone-coated kraft paper and the like.

Tapes of the invention may also incorporate a low adhesion backsize (LAB) which are known in the art.

In some embodiments, such as with syrup copolymers, the syrup may be coated and cured using a construction which comprises a layer of syrup copolymer coated between two liners at least one of which is coated with a release material. The release liners typically comprise a clear polymeric material such as polyester that is transparent to ultraviolet radiation. Preferably, each release liner is first coated or primed with a release material which is incompatible with the acrylate adhesive copolymer. The adhesive composition may be cured by exposure to ultraviolet radiation which is transmitted through the release liner(s).

EXAMPLES

Materials

| Designation | Description | Source |
|---|---|---|
| 4-HBA | 4-hydroxybutyl acrylate | Sigma Aldrich, St. Louis, MO |
| DMA | N,N-Dimethylacrylamide | Sigma Aldrich, St. Louis, MO |
| DMEA | 2-(Dimethylamino)ethyl acrylate | Sigma Aldrich, St. Louis, MO |
| IOTG | Isooctyl Thioglycolate | TCI America, Portland, OR |
| HDDA | 1,6-hexanediol diacrylate | Sartomer, Exton, PA |
| AlA | Allyl Acrylate | Alfa Aesar, Ward Hill, MA |
| t-BA | tert-Butyl acrylate | Alfa Aesar, Ward Hill, MA |
| PIA | IRGACURE 2959 acrylate (ZLI-3331) | BASF, Germany |
| IRG651 | IRGACURE 651 | BASF, Germany |
| IBOA | Isobornyl acrylate | Sartomer, Exton, PA |
| AZSi | 3-trimethoxysilylpropyl 3-(2-methylaziridin-1-yl)propanoate | Synthesized at 3M Co., St. Paul, MN (vide infra) |
| AZBP | (4-benzoylphenyl) 3-(2-methylaziridin-1-yl)propanoate | Synthesized at 3M Co., St. Paul, MN (vide infra) |
| AZA | N-[1,1-dimethyl-2-(2-methylaziridin-1-yl)-2-oxo-ethyl]prop-2-enamide | Synthesized at 3M Co., St. Paul, MN (vide infra) |
| AZPIA | 2-[4-(2-hydroxy-2-methyl-propanoyl)phenoxy]ethyl 3-(2-methylaziridin-1-yl)propanoate | Synthesized at 3M Co., St. Paul, MN (vide infra) |
| TEA | Triethylamine | Sigma Aldrich, St. Louis, MO |
| IOA | Isooctylacrylate | 3M Co., St. Paul, MN |
| AA | Acrylic acid | Sigma Aldrich, St. Louis, MO |
| BTMPT | 2,4-bis-trichloromethyl-6-(4-methoxy-phenyl)-1,3,5-triazine | Can be prepared according to Wakabayashi et al., Bull. Chem. Soc. Jap, Vol. 42, pages 2924-2930 (1969) |
| VAZO 67 | 2,2'azobis-(2-methylbutyronitrile) | DuPont, Wilmington, DE |
| 4-HBAGE | 4-hydroxybutyl acrylate glycidyl ether | Nippon Kasei Chemical Co. LTD., Tokyo, Japan |
| HOSTAPHAN 3SAB | primed polyester film, available from Mitsubishi, Greer, SC, under the trade designation "HOSTAPHAN 3SAB" | Mitsubishi, Greer SC |
| TFA | Trifluoroacetic acid | Sigma Aldrich, St. Louis, MO |

As used herein, "pph" refers to parts per one hundred parts of the monomers that would be in an unmodified acid-functional (meth)acrylic copolymer (e.g., 100 parts of IOA and AA total).

Test Methods

Peel Adhesion Test (ASTM D 3330/D 3330M-041)

The test measures the force required to peel the tape from glass at an angle of 180 degrees. The test was performed on conditioned tapes prepared in the examples using the procedure described in ASTM D 3330/D 3330M-041. The adhesive formulation to be tested was coated onto HOS- TAPHAN 3SAB primed polyester film. A test sample was prepared by adhering a 12.7-millimeter (12.7-mm) wide tape to a glass ("Peel glass"), stainless steel plate or high density polyethylene coupon ("Peel PP") and rolling over the tape four times with 2-kilogram (2-kg) roller. Prior to peel and shear testing, tapes were conditioned for 24 hours in a controlled environment room (23° C./50% relative humidity). The tape was tested on a tensile force tester at a platen speed of 12 inches/minute (305 millimeter/minute (mm/min)). Three samples were tested for each example. The averaged values were expressed in Newtons per decimeter (N/dm).

Shear Strength Test (ASTM D-3654/D 3654M 061)

The test measures the static shear strength of an adhesive tape in minutes at room temperature (RT) or at elevated temperature (70° C.), as described immediately below, when one end of the tape was adhered to a stainless steel plate, suspended vertically, and a weight was attached to the free end of the tape. The time, in minutes, for the tape to fall from the panel was measured and the time to failure was recorded.

Shear 70° C.

A test sample was prepared from the conditioned tapes prepared in the examples. A 12.7 mm wide by 25.4 mm long tape was adhered to one edge of a stainless steel plate so that it overlapped the panel by 12.7 mm, and a 2 kg roller was rolled four times over the portion of tape adhered to the panel. A 0.5 kg weight was attached to the free end of the tape, and the panel was suspended vertically in an oven set at 70° C. The time, in minutes, for the tape to fall from the panel was measured, and the time to failure and the mode of failure were recorded. The failure mode was designated as pop-off ("p") in which the adhesive tape is cleanly delaminated from the panel, two-bond ("2b") failure, wherein the adhesive tape is delaminated from the carrier backing, or cohesive ("c") failure, in which the adhesive splits and part of the adhesive is left on the tape and part is left on the tape backing. The test was terminated if failure had not occurred in 10,000 minutes and the results recorded. The data reported was an arithmetic average of three measurements.

Preparation of Low Molecular Weight (LMW) Syrup A.

A one quart jar was charged with 240 grams (80 pph) of IOA, 60 grams (20 pph) of IBOA, 0.12 gram (0.04 pph) of IRG651 and 0.6 gram (0.2 pph) of IOTG. The monomer mixture was purged with nitrogen for 5 minutes then exposed to low intensity ultraviolet radiation until a 40% by weight of copolymer was formed, after which 0.6 gram (0.2 pph) of TEA was added and the mixture was rolled overnight to totally consume the IOTG. After that, an additional 0.48 gram (0.16 pph) of IRG651 was added, to give the total amounts shown in Table 1.

Preparation of High Molecular Weight (HMW) Syrup B.

A one quart jar was charged with 240 grams (80 pph) of IOA, 60 grams (20 pph) of IBOA, and 0.12 grams (0.04 pph) of IRG651. The monomer mixture was purged with nitrogen for 5 minutes then exposed to low intensity ultraviolet radiation until a 10% by weight of copolymer was formed, after which an additional 0.48 gram (0.16 pph) of the IRG651 was added, to give the total amounts shown in Table 1.

TABLE 1

|  | 40% LMW Syrup A (pph) | 10% HMW Syrup B (pph) |
| --- | --- | --- |
| IOA | 80 | 80 |
| IBOA | 20 | 20 |

TABLE 1-continued

|  | 40% LMW Syrup A (pph) | 10% HMW Syrup B (pph) |
| --- | --- | --- |
| IRGACURE 651 | 0.2 | 0.2 |
| IOTG | 0.2 | — |
| TEA | 0.2 | — |

Preparation of Examples 1 to 6 and Comparative Examples C1 and C2 from Syrup A and Syrup B Syrup A and Syrup B were blended together at different ratios, in some instances with additional AA, as summarized in Table 2. The mixture was then coated on HOSTAPHAN 3SAB primed polyester film at a 2 mil (~50 micrometers) thickness, and cured by UVA light (500 mJ/cm$^2$).

TABLE 2

| Example | LMW Syrup A (pph) | HMW Syrup B (pph) | AA (pph) | Shear 70° C. (min) | Peel PP N/dm |
| --- | --- | --- | --- | --- | --- |
| 1 | 20 | 80 | 2 | 10000 | 39 |
| 2 | 40 | 60 | 2 | 10000 | 39 |
| 3 | 60 | 40 | 2 | 1873 c | 45 |
| 4 | 20 | 80 | — | 10000 | 36 |
| 5 | 40 | 60 | — | 888 c | 43 |
| 6 | 60 | 40 | — | 29 c | 41 |
| C1 | — | 100 | — | 10000 | 31 |
| C2 | 100 | — | — | 1 c | 49 c | c—cohesive failure

Preparation of the Low Molecular Weight (LMW) Syrup C.

A one quart jar was charged with 270 grams (90 pph) of IOA, 54 grams (18 pph) t-BA, 0.12 gram (0.04 pph) of IRG651, and 0.6 gram (0.2 pph) of IOTG. The monomer mixture was purged with nitrogen for 5 minutes then exposed to low intensity ultraviolet radiation until a 40% by weight of copolymer was formed, after which 0.6 gram (0.2 pph) of TEA was added, and the mixture was rolled overnight to totally consume the IOTG (amounts were as summarized in Table 3).

Preparation of the High Molecular Weight (HMW) Syrup D.

A one quart jar was charged with 270 grams (90 pph) of IOA, 54 grams (18 pph) of t-BA, and 0.12 gram (0.04 pph) of IRGACURE 651, as summarized in Table 3. The monomer mixture was purged with nitrogen for 5 minutes then exposed to low intensity ultraviolet radiation until a 10% by weight of copolymer was formed.

TABLE 3

|  | 40% LMW Syrup C (pph) | 10% HMW Syrup D (pph) |
| --- | --- | --- |
| IOA | 90 | 90 |
| t-BA | 18 | 18 |
| IRG651 | 0.04 | 0.04 |
| IOTG | 0.2 | — |
| TEA | 0.2 | — |

Preparation of Example 7 and Comparative Example C3 from Syrup C and Syrup D

Syrup C and Syrup D were blended together at 40/60 ratio; a few drops of TFA were added to convert the t-butyl groups to AA. Then additional 0.16 pph of the IRG651 was added followed by 0.08 pph of HDDA and 0.1 pph of BTMPT as shown in Table 4. The syrups were then coated on HOSTAPHAN 3SAB primed polyester film at a 2.4 mil (~60 micrometers) thickness and cured by UVA light (500 mJ/cm$^2$).

TABLE 4

| | t-BA | | | | | |
|---|---|---|---|---|---|---|
| Example | LMW Syrup C (pph) | HMW Syrup D (pph) | HDDA (pph) | BTMPT (pph) | Shear 70° C (min) | Peel Glass N/dm |
| 7 | 40 | 60 | 0.08 | 0.1 | 10000 | 9 |
| C3 | 40 | 60 | — | — | 1$^c$ | 75$^c$ |

$^c$cohesive failure

Preparation of Examples 8 to 10 and Comparative Examples C1 and C2 from Syrup A and Syrup B Syrup A and Syrup B were blended together at different ratios with additional ingredients as shown in table 5 and then coated on HOSTAPHAN 3SAB primed polyester film at a 2 mil (~50 micrometers) thickness and cured by UVA light (500 mJ/cm$^2$).

TABLE 5

| | Branching agents | | | | | |
|---|---|---|---|---|---|---|
| Example | LMW Syrup A (pph) | HMW Syrup B (pph) | AA (pph) | Allyl Acrylate (pph) | Shear 70° C. (min) | Peel PP N/dm |
| 8 | 20 | 80 | 2 | 0.2 | 10000 | 29 |
| 9 | 40 | 60 | 2 | 0.2 | 10000 | 32 |
| 10 | 60 | 40 | 2 | 0.2 | 10000 | 33 |
| C1 | — | 100 | — | — | 10000 | 31 |
| C2 | 100 | — | — | — | 1 c | 49 c | c—cohesive failure

Preparation of Examples 11 to 13 and Comparative Examples C1 and C2 from Syrup A and Syrup B Syrup A and Syrup B were blended together at different ratios with additional ingredients as shown in table 6 and then coated on HOSTAPHAN 3SAB primed polyester film at a 2 mil (~50 micrometers) thickness and cured by UVA light (500 mJ/cm$^2$).

TABLE 6

| | PIA | | | | | |
|---|---|---|---|---|---|---|
| Example | LMW Syrup A (pph) | HMW Syrup B (pph) | AA (pph) | PIA (pph) | Shear 70° C. (min) | Peel PP N/dm |
| 11 | 20 | 80 | 2 | 0.2 | 10000 | 35 |
| 12 | 40 | 60 | 2 | 0.2 | 10000 | 45 |
| 13 | 60 | 40 | 2 | 0.2 | 1227 c | 46 |
| C1 | — | 100 | — | — | 10000 | 31 |
| C2 | 100 | — | — | — | 1 c | 49 c | c—cohesive failure

Preparation of 3-trimethoxysilylpropyl 3-(2-methylaziridin-1-yl)propanoate ("AZSi")

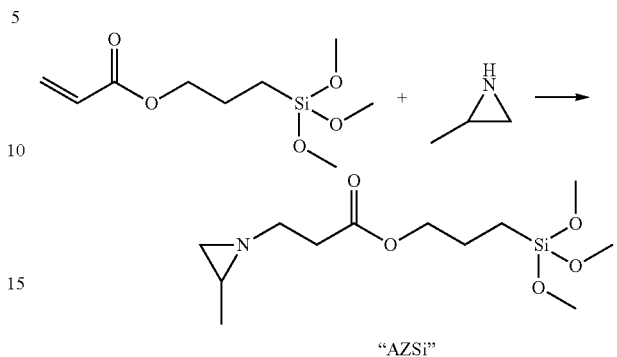

"AZSi"

To a round bottom flask were added 3-trimethoxysilylpropyl prop-2-enoate (10 g, 42.677 mmol, 1.0 eq) in a mixture of n hexane (5.9 g) and ethyl acetate (9 g). 2-methylaziridine (3.249 g, 51.2 mmol, 1.2 eq) was added quickly dropwise. The reaction mixture was allowed to stir at room temperature overnight, and monitored by TLC and NMR. Upon completion, the solvent was removed under reduced pressure to give product 3-trimethoxysilylpropyl 3-(2-methylaziridin-1-yl)propanoate ("AZSi").

Preparation of (4-benzoylphenyl) 3-(2-methylaziridin-1-yl)propanoate ("AZBP")

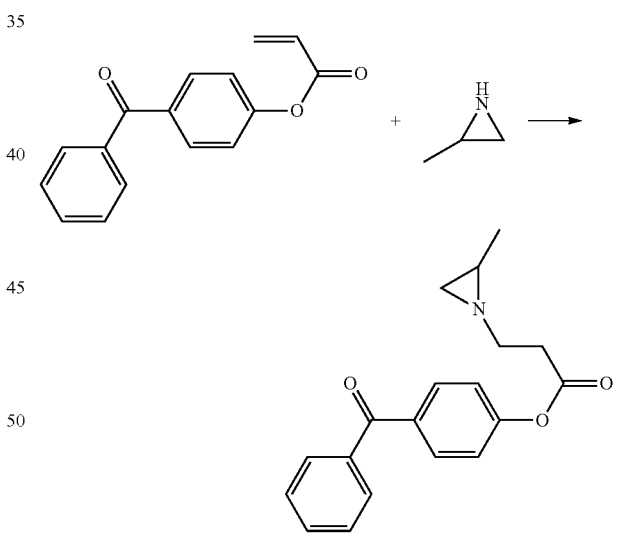

"AZBP"

To a 100 mL flask were added 4-acryloxy benzophenone (6.00 g, 23.8 mmol, 1.00 eq) in n-hexane (5.9 g, 69 mmol) and ethyl acetate (5.4 g, 61 mmol). 2-methylaziridine (1.70 g, 26.9 mmol, 1.2 eq) was added. A slight exotherm was observed. The reaction mixture was allowed to stir at room temperature for 20 hours, at which point $^{13}$C NMR showed alkene peaks remaining. Additional 2-methylaziridine (1.7 g, 1.2 eq) in ethyl acetate (12.0 g) was added and the reaction stirred for a further 20 hours until complete consumption of starting material was observed by TLC and $^{13}$C NMR.

Preparation of the Low Molecular Weight (LMW) Syrup E.

A one quart jar was charged with 240 grams (80 pph) of IOA, 57 grams (19 pph) of IBOA, 3 grams (1 pph) of AA, 0.12 gram (0.04 pph) of IRG651, and 0.6 gram (0.2 pph) of IOTG. The monomer mixture was purged with nitrogen for 5 minutes then exposed to low intensity ultraviolet radiation until a 40% by weight of copolymer was formed, after which 0.6 gram (0.2 pph) of TEA was added and rolled overnight to totally consume the IOTG. Amounts were as summarized in Table 7.

Preparation of the High Molecular Weight (HMW) Syrup F.

A one quart jar was charged with 240 grams (80 pph) of IOA, 57 grams (19 pph) of IBOA, 3 grams (1 pph) of AA, and 0.12 gram (0.04 pph) of IRGACURE 651, as summarized in Table 7. The monomer mixture was purged with nitrogen for 5 minutes then exposed to low intensity ultraviolet radiation until a 10% by weight of copolymer was formed.

TABLE 7

|  | LMW Syrup E (pph) | HMW Syrup F |
|---|---|---|
| IOA | 80 | 80 |
| IBOA | 19 | 19 |
| AA | 1 | 1 |
| IRG651 | 0.04 | 0.04 |
| IOTG | 0.2 | — |
| TEA | 0.2 | — |

Preparation of Example 14 and Comparative Example C4 from Syrup E and Syrup F

Syrup E and Syrup F were blended together at a 50/50 ratios, after which an additional 0.48 gram (0.16 pph) of IRG651 was added. Additional ingredients were added as shown in Table 8, and the mixture was then coated on HOSTAPHAN 3SAB primed polyester film at a 2 mil (~50 micrometers) thickness and cured by UVA light (500 mJ/cm²).

Preparation of Examples 15 to 16 from Syrup E and Syrup F

To syrup E, 0.2 pph (with respect to syrup E only) of AZBP was and added mixed together for 2 hours, then 0.32 pph (with respect to syrup E only) of the IRG651 was added. After that, Syrup F was blended in at a 50/50 ratio and then coated on HOSTAPHAN 3SAB primed polyester film at a 2 mil (~50 micrometers) thickness and cured by UVA light (500 mJ/cm²). The adhesive film for Example 16 was then exposed to additional 200 mJ/cm² of UVC.

TABLE 8

| | | | Aziridinyl compounds | | | | |
|---|---|---|---|---|---|---|---|
| Example | Syrup E (pph) | Syrup F (pph) | AzBP (pph, with respect to Syrup E + Syrup F) | AztAS (pph) | BTMPT (pph) | Shear 70° C. (min) | Peel Glass N/dm |
| 14 | 50 | 50 | — | 0.1 | 0.15 | 226 p | 36 |
| 15 | 50 | 50 | 0.1 | — | 0.15 | 222 c | 42 |
| 16 | 50 | 50 | 0.1 | — | 0.15 | 343 p | 44 |
| C4 | 50 | 50 | — | — | — | 1 c | 90 c | c—cohesive failure
p—pop off failure

Preparation of the Low Molecular Weight (LMW) Syrup G.

A one quart jar was charged with 270 grams (90 pph) of IOA, 3 grams (1 pph) of AA, 0.12 gram (0.04 pph) of IRG651 and 0.6 gram (0.2 pph) of IOTG, as summarized in Table 9. The monomer mixture was purged with nitrogen for 5 minutes then exposed to low intensity ultraviolet radiation until a 40% by weight of copolymer was formed.

Preparation of the High Molecular Weight (HMW) Syrup H.

A one quart jar was charged with 270 grams (90 pph) of IOA, 30 g (30 pph) of AA, and 0.12 gram (0.04 pph) of IRGACURE 651, as summarized in Table 9. The monomer mixture was purged with nitrogen for 5 minutes then exposed to low intensity ultraviolet radiation until a 10% by weight of copolymer was formed.

TABLE 9

| | IOA/AA adhesive blends | |
|---|---|---|
| | LMW Syrup G | HMW Syrup H |
| | (pph) | |
| IOA | 90 | 90 |
| AA | 1 | 10 |
| IRG651 | 0.04 | 0.04 |
| IOTG | 0.2 | — |

Preparation of Example 17 to 18 and Comparative Example C5 from Syrup G and Syrup H To Syrup G, 9 pph of AA were blended with Syrup H in the ratios summarized in Table 10, followed by an addition of 0.16 pph of IRG651. Before coating, 0.15 pph of BTMPT was added as shown in Table 10, and then the mixture was coated on HOSTAPHAN 3SAB primed polyester film at a 2 mil (~50 micrometers) thickness and cured by UVA light (500 mJ/cm²).

TABLE 10

| | IOA/AA adhesive blends | | | | |
|---|---|---|---|---|---|
| Example | LMW Syrup G (pph) | HMW Syrup H (pph) | BTMPT (pph) | Shear 70° C. (min) | Peel Glass N/dm |
| 17 | 100 | — | 0.15 | 10000 | 29 |
| 18 | 50 | 50 | 0.15 | 10000 | 12 2b |
| C5 | 100 | — | — | 1 c | 3 c | c—cohesive failure
2b—two bond failure

Preparation of Low Molecular Weight (LMW) Syrup I

A one quart jar was charged with 270 grams (90 pph) of IOA, 3 grams (1 pph) of AA, 0.12 gram (0.04 pph) of IRG651 and 0.6 gram (0.2 pph) of IOTG. The monomer mixture was purged with nitrogen for 5 minutes then exposed to low intensity ultraviolet radiation until a 40% by weight of copolymer was formed, as summarized in Table 1.

TABLE 11

Acid-base interactions

| | LMW Syrup I (pph) |
|---|---|
| IOA | 90 |
| AA | 1 |
| IRG651 | 0.04 |
| IOTG | 0.2 |

Preparation of Examples 19 to 20 and Comparative Example C6 from Syrup I and Syrup H To Syrup I, 3.0 grams (1 pph) of TEA was added and rolled overnight to totally consume the IOTG. Then 9 pph of AA was added and blended together with Syrup H at specific ratios, with an additional 0.16 pph of the IRG651. Before coating, 0.15 pph of BTMPT was added as shown in Table 12 and then coated on HOSTAPHAN 3SAB primed polyester film at a 2 mil (~50 micrometers) thickness and cured by UVA light (500 mJ/cm²).

TABLE 12

Acid-base interactions

| Example | LMW Syrup I (pph) | HMW Syrup H (pph) | BTMPT (pph) | Shear 70° C. (min) | Peel Glass N/dm |
|---|---|---|---|---|---|
| 19 | 50 | 50 | 0.15 | 10000 | 45 |
| 20 | 30 | 70 | 0.15 | 10000 | 38 |
| C6 | 100 | — | — | 1 c | 77 | c—cohesive failure

Preparation of N-[1,1-dimethyl-2-(2-methylaziridin-1-yl)-2-oxo-ethyl]prop-2-enamide ("AZA")

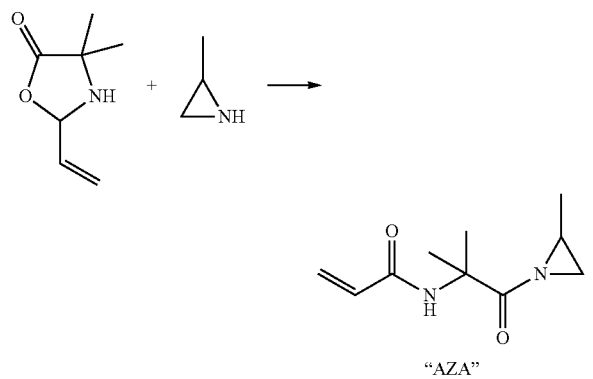

To a stirred solution of 4,4-dimethyl-2-vinyl-oxazolidin-5-one (13.9 g, 98.5 mmol, 1.00 eq) in ethyl acetate (10 g, 200 mmol) and n-hexane (23.0 g, 267 mmol) was added 2-methylaziridine (6.75 g, 118 mmol, 1.20 eq) rapidly dropwise. The reaction mixture was stirred overnight and a white solid was formed. The solid was filtered off, washed with 50 mL of hexane, and dried to provide the desired product. NMR and IR spectral analyses confirmed the structure of the product.

Preparation of 2-[4-(2-hydroxy-2-methyl-propanoyl) phenoxy]ethyl 3-(2-methylaziridin-1-yl)propanoate ("AZPIA")

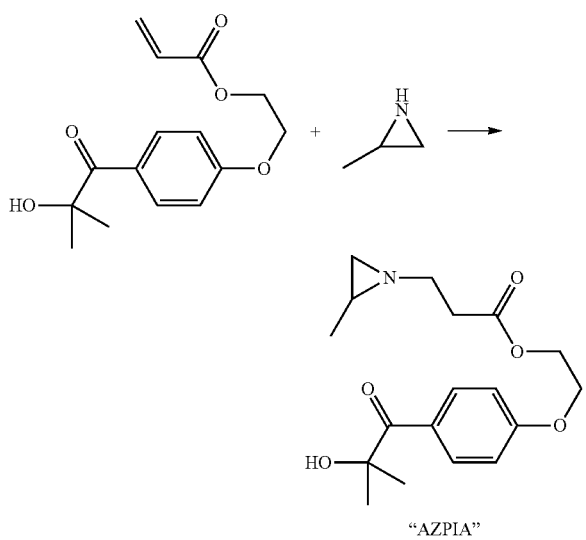

To a 100 mL flask were added 2-[4-(2-hydroxy-2-methyl-propanoyl)phenoxy]ethyl prop-2-enoate (6 g, 21.56 mmol, 1.00 eq) in n-hexane (5.92 g, 68.7 mmol) and ethyl acetate (4 g, 40 mmol). 2-methylaziridine (1.391 g, 24.36 mmol, 1.12 eq) was added. The reaction mixture was allowed to stir at room temperature overnight, and the solvent was removed under reduced pressure to provide the desired product ("AZPIA"), which was confirmed by NMR and IR analysis.

Preparation of the Low Molecular Weight (LMW) Syrup J

A one quart jar was charged with 270 grams (90 pph) of IOA, 30 g (10 pph) of AA, 0.12 gram (0.04 pph) of IRG651 and 0.6 gram (0.2 pph) of IOTG, as summarized in Table 13. The monomer mixture was purged with nitrogen for 5 minutes then exposed to low intensity ultraviolet radiation until a 40% by weight of copolymer was formed.

TABLE 13

| | LMW Syrup J (pph) |
|---|---|
| IOA | 90 |
| AA | 10 |
| IOTG | 1 |
| IRG651 | 0.04 |

Preparation of Examples 21 to 29 from Syrup J and Syrup H

Examples 21 to 23 were prepared by first reacting Syrup J with N-[1,1-dimethyl-2-(2-methylaziridin-1-yl)-2-oxo-ethyl]prop-2-enamide (AZA) (1 molar equivalent aziridine to AA). The reaction was stirred at room temperature and monitored by ¹H NMR until complete. Solvent was removed under reduced pressure. After that Syrup H was blended in at specific ratios, with an additional 0.16 pph of the IRG651 as shown in Table 14. Before coating, 0.15 pph of BTMPT were added and then coated on HOSTAPHAN 3SAB primed polyester film at a 2 mil (~50 micrometers) thickness and cured by UVA light (500 mJ/cm$^2$).

Examples 24 and 25 were prepared by first reacting Syrup J with 2-[4-(2-hydroxy-2-methyl-propanoyl)phenoxy]ethyl 3-(2-methylaziridin-1-yl)propanoate (AZPIA) (1 molar equivalent aziridine to AA). The reaction was stirred at room temperature and monitored by $^1$H NMR until complete. Solvent was removed under reduced pressure. After that Syrup H was blended in at specific ratios as shown in table 14. Before coating, 0.15 pph of BTMPT were added and then coated on HOSTAPHAN 3SAB primed polyester film at a 2 mil (~50 micrometers) thickness and cured by UVA light (500 mJ/cm$^2$).

Examples 26 and 27 were prepared by first reacting Syrup J with N-[1,1-dimethyl-2-(2-methylaziridin-1-yl)-2-oxo-ethyl]prop-2-enamide (AZA) (1 molar equivalent aziridine to AA). The reaction was stirred at room temperature and monitored by $^1$H NMR until complete. Solvent was removed under reduced pressure. After that Syrup H and J ware blended in at specific ratios, with an additional 0.16 pph of the IRG651 as shown in Table 14. Before coating, 0.15 pph of BTMPT were added and then coated on HOSTAPHAN 3SAB primed polyester film at a 2 mil (~50 micrometers) thickness and cured by UVA light (500 mJ/cm$^2$).

Examples 28 and 29 were prepared by first reacting Syrup J with 2-[4-(2-hydroxy-2-methyl-propanoyl)phenoxy]ethyl 3-(2-methylaziridin-1-yl)propanoate (AZPIA) (1 molar equivalent aziridine to AA). The reaction was stirred at room temperature and monitored by $^1$H NMR until complete. Solvent was removed under reduced pressure. After that Syrup H and J ware blended in at specific ratios, with an additional 0.16 pph of the IRG651 as shown in Table 14. Before coating, 0.15 pph of BTMPT were added and then coated on HOSTAPHAN 3SAB primed polyester film at a 2 mil (~50 micrometers) thickness and cured by UVA light (500 mJ/cm$^2$).

TABLE 14

| Example | LMW Syrup J, aziridine-functionalized (pph) | LMW Syrup J (pph) | HMW Syrup H (pph) | IRG651 (pph) | Shear 70° C. (min) | Peel Glass N/dm |
|---|---|---|---|---|---|---|
| 21 | 100 | — | — | 0.16 | 10000 | 1.00 |
| 22 | 50 | — | 50 | 0.16 | 10000 | 1.00 |
| 23 | 30 | — | 70 | 0.16 | 10000 | 1.00 |
| 24 | 100 | — | — | — | 10000 | 8.00 |
| 25 | 50 | — | 50 | — | 10000 | 31.00 |
| 26 | 10 | 40 | 50 | 0.16 | 10000 | 41 |
| 27 | 5 | 45 | 50 | 0.16 | 10000 | 36 |
| 28 | 10 | 40 | 50 | 0.16 | 10000 | 40 |
| 29 | 5 | 45 | 50 | 0.16 | 10000 | 45 |

Preparation of syrups via thermal radical polymerization
Syrup K

A 250 ml amber jar was charged with 90 grams (90 pph) of IOA, 10 grams (10 pph) of AA, 0.2 gram (0.2 pph) of IRGACURE 2959 acrylate (PIA), and 0.2 gram (0.2 pph) of thermal radical initiator VAZO 67). The monomer mixture was purged with nitrogen for 15 minutes then the bottles were capped tightly and put in an ATLAS M228AA LAUNDER-OMETER at 70° C. for 1 hour. The copolymer that was formed was then diluted with 90/10 IOA/AA momomer mixture to 22% by weight of polymer, after which an 0.2 gram (0.2 pph) of the IRG651 and 0.15 gram (0.15 pph) of triazine BTMPT were added as summarized in Table 15.

Syrup L

A 250 ml amber jar was charged with 90 grams (90 pph) of IOA, 10 grams (10 pph) of AA, 0.4 gram (0.4 pph) of ABP, and 0.2 gram (0.2 pph) of thermal radical initiator VAZO 67. The monomer mixture was purged with nitrogen for 15 minutes then the bottles were capped tightly and put in an ATLAS M228AA LAUNDER-OMETER at 70° C. for 1 hour. The copolymer that was formed was then diluted with 90/10 IOA/AA momomer mixture to 22% by weight of polymer, after which an 0.2 gram (0.2 pph) of IRG651 and 0.15 gram (0.15 pph) of triazine BTMPT were added, as summarized in Table 15. During syrupping, the mixture contained LMW polymer, reactive LMW polymer and monomer. The reactive LMW polymer was then converted to high HMW polymer during the final UV exposure on web.

TABLE 15

|  | Syrup K | Syrup L |
|---|---|---|
|  | (pph) |  |
| IOA | 90 | 90 |
| AA | 10 | 10 |
| PIA | 0.2 | — |
| ABP | — | 0.4 |
| VAZO 67 | 0.2 | 0.2 |
| IRG651 | 0.2 | 0.2 |
| BTMPT | 0.15 | 0.15 |

Preparation of Examples 30 to 31 from Syrups K and L

Separately, Syrups K and L were coated on HOSTAPHAN 3SAB primed polyester film at a 2 mil (~50 micrometers) thickness and cured by UVA light (500 mJ/cm$^2$) or by UVA (500 mJ/cm$^2$) and follow with UVC (200 mJ/cm$^2$). Relative amounts and test results were as summarized in Table 16.

TABLE 16

| Thermal polymerization, no mercaptan | | | | |
|---|---|---|---|---|
| Example | Syrup K (pph) | Syrup L (pph) | 70° Shear (min) | Peel Glass N/dm |
| 30 | 100 | — | 10000 | 2 |
| 31 | — | 100 | 10000 | 11 |

Preparation of the Low Molecular Weight (LMW) Syrup M

A one quart jar was charged with 285 grams (95 pph) of IOA, 15 g (5 pph) of 4-HBA, 0.12 gram (0.04 pph) of IRG651, and 0.6 gram (0.2 pph) of IOTG. The monomer mixture was purged with nitrogen for 5 minutes then exposed to low intensity ultraviolet radiation until a 24% by weight of copolymer was formed, after which 0.6 gram (0.2 pph) of TEA) was added, and the mixture was rolled overnight to totally consume the IOTG. After that, an additional 0.48 gram (0.16 pph) of the IRG651 and 0.45 gram (0.15 pph) of triazine BTMPT were added, as summarized in Table 17.

Preparation of the Low Molecular Weight (LMW) Syrup N

A one quart jar was charged with 294 grams (98 pph) of IOA, 6 grams (2 pph) of DMAEA, 0.12 gram (0.04 pph) of IRG651, and 0.6 gram (0.2 pph) of IOTG. The monomer mixture was purged with nitrogen for 5 minutes then exposed to low intensity ultraviolet radiation until a 22% by weight of copolymer was formed, after which 0.6 gram (0.2 pph) of TEA was added and rolled overnight to totally consume the IOTG. After that an additional 0.48 gram (0.16 pph) of the IRG651 and 0.45 gram (0.15 pph) of triazine BTMPT were added, as summarized in Table 17.

Preparation of the Low Molecular Weight (LMW) Syrup O

A one quart jar was charged with 294 grams (98 pph) of IOA, 6 grams (2 pph) of DMAEA, 0.12 grams (0.04 pph) of IRG651, and 0.6 gram (0.2 pph) of IOTG. The monomer mixture was purged with nitrogen for 5 minutes then exposed to low intensity ultraviolet radiation until a 22% by weight of copolymer was formed, after which an additional 0.48 gram (0.16 pph) of the IRG651 and 0.45 gram (0.15 pph) of triazine BTMPT were added, as summarized in Table 17.

TABLE 17

|  | IOA (pph) | 4-HBA (pph) | DMAEA (pph) | IRG651 (pph) | IOTG (pph) | TEA (pph) | BTMPT (pph) |
|---|---|---|---|---|---|---|---|
| Syrup M | 95 | 5 | — | 0.2 | 0.2 | 0.2 | 0.15 |
| Syrup N | 98 | — | 2 | 0.2 | 0.2 | 0.2 | 0.15 |
| Syrup O | 98 | — | 2 | 0.2 | 0.2 | — | 0.15 |

Preparation of Examples 32 to 34 from Syrups M, N and O

Separately, Syrups M, N and O were coated on HOSTAPHAN 3SAB primed polyester film at a 2 mil (~50 micrometers) thickness and cured by UVA light (500 mJ/cm$^2$).

TABLE 18

Functional monomer examples, including self-quenching system

| Example | LMW Syrup M (pph) | LMW Syrup N (pph) | LMW Syrup O (pph) | 70° Shear (min) | Peel Glass N/dm |
|---|---|---|---|---|---|
| 32 | 100 | — | — | 10000 | 2 |
| 33 | — | 100 | — | 10000 | 9 |
| 34 | — | — | 100 | 10000 | 6 |

Preparation of the LMW/HMW Syrup P.

A one quart jar was charged with 240 grams (80 pph) of IOA, 60 grams (20 pph) of IBOA, 0.12 gram (0.04 pph) of IRG651, and 0.6 gram (0.2 pph) of IOTG. The monomer mixture was purged with nitrogen for 5 minutes then exposed to low intensity ultraviolet radiation until a 54% by weight of copolymer was formed. The syrup was then diluted with 80/20 IOA/IBOA blend to 18.5% of copolymer by weight in the final mixture, after which 0.2 pph (based on original syrup) of TEA was added, and the mixture was rolled overnight to totally consume the IOTG. After that an additional 0.04 pph (based on diluents blend) of the IRG651 was added and the syrup was purged with nitrogen for 15 min then exposed to low intensity ultraviolet radiation until the copolymer level increased to 25.5% by weight of total mixture.

Preparation of Examples 35 to 38 and Comparative Examples C7 and C8 from Syrup P For Examples 35 to 37, Syrup P was blended together at different ratios with additional ingredients according to the entries in Table 19. The samples were then coated on HOSTAPHAN 3SAB primed polyester film at a 2 mil (~50 micrometers) thickness and cured by UVA light (500 mJ/cm$^2$). The adhesive film for Example 38 was prepared in the same manner as Examples 35 to 37, but was exposed to additional 300 mJ of UVC before testing for shear measurement.

TABLE 19

| Example | Syrup S-1 80/20 IOA/IBOA LMW/HMW (pph) | IRG651 (pph) | AA (pph) | Branching Agent (pph) | BTMPT (pph) | 70° C. Shear (min) | Peel Glass N/dm |
|---|---|---|---|---|---|---|---|
| C7 | 100 | 0.16 | — | — | — | 1 c | 72 c |
| 35 | 100 | 0.16 | — | — | 0.1 | 28 c | 28 |
| C8 | 100 | 0.16 | — | 0.1 (A1A) | — | 1 c | 21 |
| 36 | 100 | 0.16 | — | 0.1 (A1A) | 0.1 | 2537 p | 20 |
| 37 | 100 | 0.16 | 2 | 0.05 (HDDA) | 0.1 | 10000 | 9 |
| 38 | 100 | — | 2 | 0.1 (PIA) | 0.1 | 2455 p | 39 | c—cohesive failure
p—pop off failure

The invention claimed is:

1. A method for preparing (meth)acrylate adhesives comprising the steps of:
   a) partially polymerizing to a conversion rate of 5 to 40% a (meth)acrylic monomer mixture in the presence of a thiol chain transfer agent to produce a first syrup polymer composition comprising a low $M_w$ solute copolymer having a $M_w$ from 3000 to 300,000 and unreacted solvent monomers;
   b) quenching the thiol chain transfer agent with an amine;
   c) providing a high $M_w$ copolymer having a $M_w$ of 300,000 to 3,000,000 to provide a second syrup polymer composition comprising a low $M_w$ solute copolymer, a high $M_w$ solute copolymer having a $M_w$ of 300,000 to 3,000,000 and unreacted solvent monomers;
   d) optionally adding a crosslinker and a photoinitiator to the second syrup polymer composition of step c); and
   e) further photopolymerize the second syrup polymer composition of step c).

2. The method of claim 1 wherein the second high $M_w$ copolymer is prepared in situ.

3. The method of claim 2 comprising the steps of:
   a) partially polymerizing a (meth)acrylic monomer mixture in the presence of a thiol chain transfer agent to produce a first syrup polymer composition comprising a low $M_w$ solute copolymer and unreacted solvent monomers;

b) quenching the thiol chain transfer agent with an amine;

c) further polymerizing to produce a second syrup polymer composition comprising a low $M_w$ solute copolymer, a high $M_w$ solute copolymer, and unreacted solvent monomers;

d) optionally adding a crosslinker and a photoinitiator to the second syrup polymer composition of step c); and e) further photopolymerize the second syrup polymer composition of step c).

4. The method of claim 3 wherein the syrup polymer composition of step d) is coated on a substrate prior to the photopolymerization step e).

5. The method of claim 3 wherein step c) is partially polymerized to a conversion of at least 1 to 25% to produce a second syrup polymer composition comprising the high $M_w$ solute copolymer having a $M_w$ of 300,000-3,000,000.

6. The method of claim 3 wherein the (meth)acrylate monomer mixture of step a) comprises:
  a) 50-99 parts by weight of (meth)acrylate ester monomers;
  b) 1-50 parts by weight of polar monomers, inclusive of acid-functional monomers wherein the sum of the monomers is 100 parts by weight.

7. The method of claim 3 wherein the (meth)acrylate monomer mixture of step a) comprises:
  a) 50-99.9 parts by weight of (meth)acrylate ester monomers;
  b) 0.1-15 parts by weight of acid-functional monomers;
  c) 0 to 50 parts by weight of polar monomers, exclusive of acid-functional monomers,
  wherein the sum of the monomers is 100 parts by weight.

8. The method of claim 3 wherein the adhesive copolymer product of step e) comprises a crosslinked high $M_w$ copolymer, and a low $M_w$ copolymer.

9. The method of claim 3 wherein the adhesive copolymer product of step e) comprises 5-20 wt % of a high $M_w$ copolymer, 5-30 wt. % of a low $M_w$ copolymer, and a 50-90 wt. % of crosslinked acrylate copolymer.

10. The method of claim 1 wherein the monomer mixture comprises less than 1 part by weight of acid-functional monomers, and 0.1 to 15 parts by weight of t-butyl acrylate monomers.

11. The method of claim 10 wherein the (meth)acrylate monomer mixture comprises:
  a) 50-99.9 parts by weight of (meth)acrylate ester monomers including 0.1 to 15 parts by weight of t-butyl acrylate monomers;
  b) less than 1 parts by weight of acid-functional monomers;
  c) 0 to 50 parts by weight of other polar monomers
  wherein the sum of the monomers is 100 parts by weight.

12. The method of claim 1 comprising the step of:
  a) partially polymerizing to a conversion rate of 5 to 40% a (meth)acrylic monomer mixture in the presence of a thiol chain transfer agent to produce a first syrup polymer composition comprising a low $M_w$ solute copolymer having a $M_w$ from 3000 to 300,000 having pendent t-butyl ester groups and unreacted solvent monomers;
  b) quench the thiol chain transfer agent by addition of an amine,
  c) further photopolymerize the syrup polymer composition of step b) to produce a second syrup polymer composition comprising the low $M_w$ solute copolymer, a high $M_w$ crosslinked solute copolymer having a $M_w$ of 300,000 to 3,000,000;
  d) add a crosslinker to the second syrup polymer composition of step c), and
  e) further photopolymerize the syrup polymer composition of step d) to produce a third syrup polymer composition comprising the low $M_w$ solute copolymer, the high $M_w$ solute copolymer, and a third crosslinked copolymer,
  wherein a catalytic amount of acid is added to the syrup polymer compositions of any of steps c), d) or e) to hydrolyze the t-butyl groups to acid groups.

13. The method of claim 1 wherein the monomer mixture further comprises dialkylaminoalkyl (meth)acrylate monomers, and the first solute copolymer has pendent dialkylaminoalkyl groups.

14. The method of claim 1 wherein the monomer mixture of step a) comprises a free-radically polymerizable photoinitiator.

15. The method of claim 14 comprising the steps of:
  a) partially thermally polymerizing the (meth)acrylic monomer mixture to a conversion rate of 5 to 40% in the presence of a thiol chain transfer agent and a polymerizable photoinitiator to produce a first syrup polymer composition comprising a low $M_w$ solute copolymer having a $M_w$ from 3000 to 300,000 having pendent photoinitiator groups and unreacted solvent monomers;
  b) quench the thiol chain transfer agent with an amine,
  c) further thermally polymerize the syrup polymer composition of step b) to produce a second syrup polymer composition comprising the low $M_w$ solute copolymer, a high $M_w$ solute copolymer having a $M_w$ of 300,000 to 3,000,000 and unreacted solvent monomers;
  d) add a crosslinking agent;
  e) further photopolymerize the syrup polymer composition of step d) to produce a composition comprising the low $M_w$ copolymer, and a crosslinked high $M_w$ copolymer.

16. The method of claim 14 comprising the steps of:
  a) partially thermally polymerizing the (meth)acrylic monomer mixture to a conversion rate of 5 to 40% in the presence of a thiol chain transfer agent and a polymerizable photoinitiator to produce a first syrup polymer composition comprising a low $M_w$ solute copolymer having a $M_w$ from 3000 to 300,000 having pendent photoinitiator groups and unreacted solvent monomers;
  b) quench the thiol chain transfer agent with an amine,
  c) add a crosslinking agent;
  d) further photopolymerize the syrup polymer composition of step c) to produce a polymer composition comprising the low $M_w$ solute copolymer, and a crosslinked high $M_w$ solute copolymer.

17. The method of claim 14 wherein the (meth)acrylate monomer mixture comprises 0.1 to 5 parts by weight of free-radically polymerizable photoinitiator, relative to 100 parts by weight total monomer.

18. A method for preparing acrylate adhesives comprising the steps of
  a) partially polymerizing an acrylic monomer mixture to a conversion rate of 5 to 40% in the presence of a thiol chain transfer agent to produce a first syrup polymer composition comprising a low $M_w$ solute copolymer having a $M_w$ from 3000 to 300,000 and unreacted solvent monomers;

b) quenching the thiol chain transfer agent
c) adding a branching agent and optional photoinitiator,
d) further polymerizing to produce a polymer composition comprising a low $M_w$ copolymer, and a high Mw crosslinked copolymer having a $M_w$ of 300,000 to 3,000,000.

19. A method for preparing acrylate adhesives comprising the steps of:
a) partially polymerizing an acrylic monomer mixture to a conversion rate of 5 to 40% in the presence of a thiol chain transfer agent to produce a first syrup polymer composition comprising a low $M_w$ solute copolymer having a $M_w$ from 3000 to 300,000 and unreacted solvent monomers;
b) quench the thiol chain transfer agent;
c) add a polymerizable photoinitiator to the syrup polymer of step b);
d) further photopolymerize the syrup polymer composition of step c) to produce a second syrup polymer composition comprising the low $M_w$ solute copolymer, a high $M_w$ solute copolymer having a $M_w$ of 300,000 to 3,000,000 having pendent photoinitiator groups, and unreacted solvent monomers; and
e) optionally add a crosslinker to the syrup polymer composition of step d); and further photopolymerizing.

20. The method of claim 19 wherein the polymerizable photoinitiator is added in amount of 0.1 to 5 parts by weight, relative to 100 parts by weight total monomer, to the syrup polymer composition of step b).

21. The method of claim 1 wherein the monomer mixture comprises functional acrylate monomer having a nucleophilic or electrophilic functional group.

22. The method of claim 21 wherein the first solute copolymer has pendent electrophilic or nucleophilic functional groups, and the functional groups of the first solute copolymer are reacted with a photoinitiator having co-reactive functional groups to produce a solute copolymer having pendent photoinitiator groups.

* * * * *